(12) United States Patent
Homad

(10) Patent No.: US 10,559,147 B2
(45) Date of Patent: Feb. 11, 2020

(54) MOBILE ACCESSORY STORAGE, SECURITY MANAGEMENT, AND TRACKING SYSTEM

(71) Applicant: A Priori, LLC, Columbia, SC (US)

(72) Inventor: Jeffrey Homad, Columbia, SC (US)

(73) Assignee: A Priori, LLC, Columbia, SC (US)

( * ) Notice: Subject to any disclaimer, the term of this patent is extended or adjusted under 35 U.S.C. 154(b) by 0 days.

(21) Appl. No.: 16/135,124

(22) Filed: Sep. 19, 2018

(65) Prior Publication Data

US 2019/0088055 A1 Mar. 21, 2019

Related U.S. Application Data

(60) Provisional application No. 62/561,469, filed on Sep. 21, 2017.

(51) Int. Cl.
*B62B 3/14* (2006.01)
*A47F 10/04* (2006.01)
(Continued)

(52) U.S. Cl.
CPC .......... *G07C 9/00309* (2013.01); *A47F 10/04* (2013.01); *B62B 3/14* (2013.01);
(Continued)

(58) Field of Classification Search
CPC .......... G07C 2009/00531; G07C 2009/00539; G07C 9/00111; G07C 9/00309; G07C 9/00182; G07C 9/00563; G07C 9/00896; H04W 4/029; H04W 4/35; B62H 3/08; B62H 3/02; B62H 2003/005; B62H 3/12; A47F 10/04; A47F 10/02; B62B 2501/065; B62B 3/14; B62B 3/1404; B62B 3/1424; B62B 2202/028; B62B 2203/02; B62B 2203/60; B62B 2205/06; B62B 3/04; B62B 3/10; B62B 5/067; G07F 7/0627; G07F 7/0636; G07F 7/02; G07F 7/0618; G07F 7/0681; G07F 9/105; G07F 11/007; G07F 11/04; G07F 11/10; G07F 11/16; G07F 11/165; G07F 11/38; G07F 11/46; G07F 11/62; G07F 17/0042; G07F 17/0057; G07F 17/0064; G07F 17/12; G07F 5/26; G07F 9/10; Y10S 194/905; G06Q 20/343; G06Q 20/208; G06Q 30/02; G06Q 10/0832;
(Continued)

(56) References Cited

U.S. PATENT DOCUMENTS 5,921,373 A * 7/1999 Amdahl .................. A47F 10/04
194/213
6,975,205 B1 12/2005 French et al.
(Continued)

FOREIGN PATENT DOCUMENTS

WO WO2006053381 5/2006

OTHER PUBLICATIONS

Tucker Gaegauf, Bikeshare Technology White Paper, Jun. 25, 2014, http://mobility-workspace.eu/wp-content/uploads/Bikeshare_Technology_White_Paper.pdf.
(Continued)

*Primary Examiner* — Dionne Pendleton
(74) *Attorney, Agent, or Firm* — Burr & Forman LLP; Douglas L. Lineberry

(57) ABSTRACT

A mobile accessory storage, maintenance and tracking system and methods of using same.

10 Claims, 23 Drawing Sheets

(51) Int. Cl.
*G07C 9/00* (2020.01)
*H04W 4/029* (2018.01)
*H04W 4/35* (2018.01)
*G07F 7/06* (2006.01)

(52) U.S. Cl.
CPC ........ *B62B 3/1404* (2013.01); *G07C 9/00111* (2013.01); *G07F 7/0681* (2013.01); *H04W 4/029* (2018.02); *H04W 4/35* (2018.02); *G07C 2009/00531* (2013.01); *G07C 2009/00539* (2013.01)

(58) Field of Classification Search
CPC ........ G06Q 20/18; G06Q 20/40; G06Q 50/12; G07G 1/0081; A42B 3/006; A63B 71/0045; B25J 11/0045; B25J 5/007; B60P 3/0257; B60P 3/20; B62D 33/042; B62D 63/04; B62J 11/005; E05B 2047/0016; E05B 2047/002; E05B 47/0012; E05B 65/48; E05B 71/00; G05D 1/0088; G05D 2201/0216; H01R 25/14; H01R 39/24; H02J 7/0027; H02J 7/0042; H05B 3/00
See application file for complete search history.

(56) References Cited

U.S. PATENT DOCUMENTS

| | | | |
|---|---|---|---|
| 7,084,740 B2 | 8/2006 | Bridgelall | |
| 7,225,980 B2 | 6/2007 | Ku et al. | |
| 7,661,459 B2 | 2/2010 | Wesley et al. | |
| 8,463,540 B2 | 6/2013 | Hannah et al. | |
| 8,700,230 B1 | 4/2014 | Hannah et al. | |
| 9,091,551 B2 | 7/2015 | Hannah et al. | |
| 9,403,548 B2 | 8/2016 | Hannah et al. | |
| 9,684,911 B2 | 6/2017 | Audet | |
| 2008/0094192 A1* | 4/2008 | Dutt | B62H 3/02 340/427 |
| 2009/0201127 A1 | 8/2009 | Stobbe et al. | |
| 2012/0019393 A1 | 1/2012 | Wolinsky et al. | |
| 2012/0212321 A1 | 8/2012 | Keener et al. | |
| 2013/0187755 A1 | 7/2013 | Rogers | |
| 2015/0070170 A1* | 3/2015 | Margalit | G07F 7/0681 340/572.1 |
| 2017/0293026 A1 | 10/2017 | Jones et al. | |
| 2017/0327142 A1 | 11/2017 | Hannah et al. | |
| 2018/0010915 A1 | 1/2018 | Wilhelm | |
| 2019/0000172 A1* | 1/2019 | Sahley | A42B 3/006 |

OTHER PUBLICATIONS

Technology Solutions, Trolley Galley Cart Tracking with RFID, Aug. 13, 2018, http://www.techsoln.com/trolleygalley-cart-tracking-rfid/.

* cited by examiner

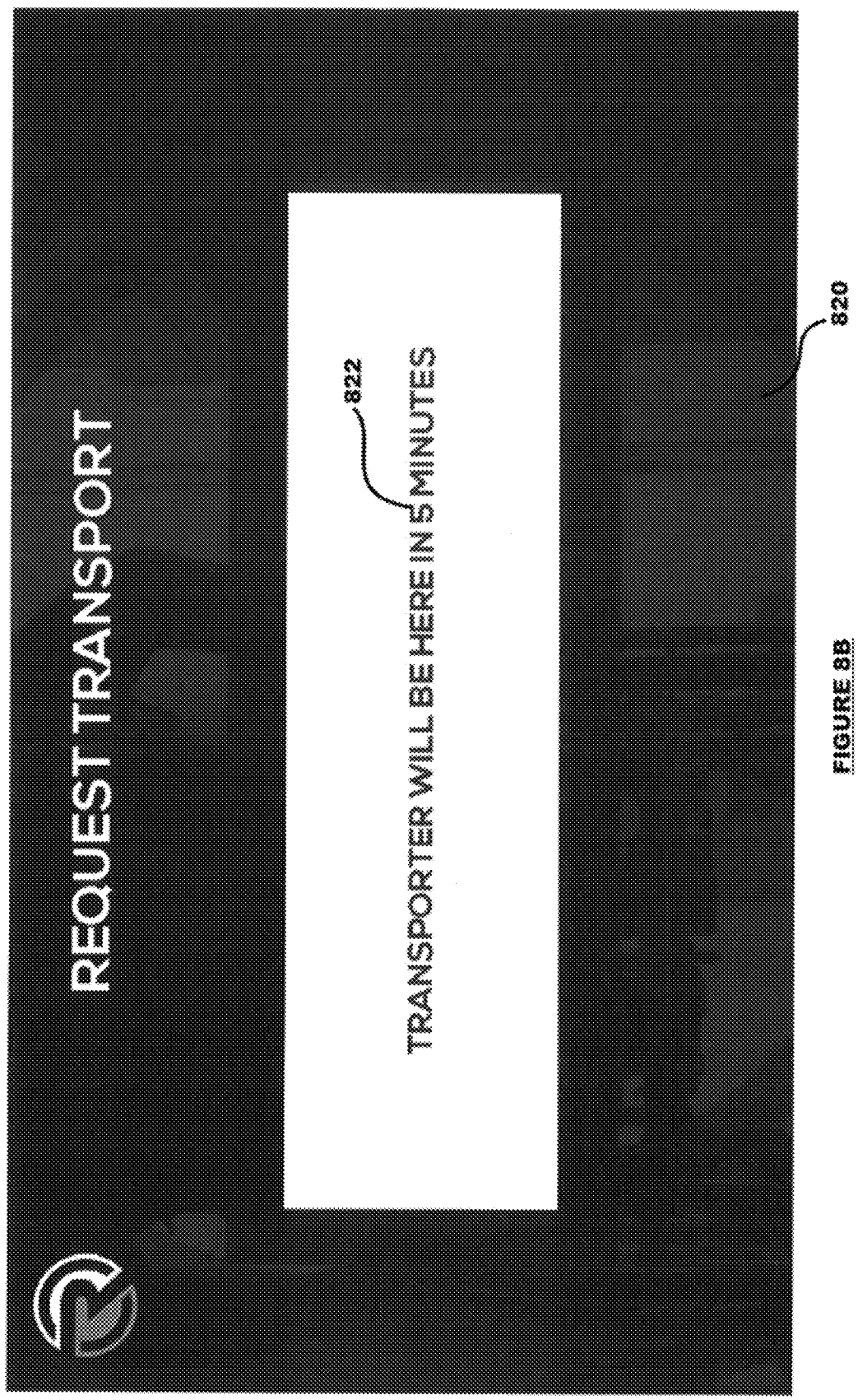

MOBILE ACCESSORY STORAGE, SECURITY MANAGEMENT, AND TRACKING SYSTEM

BACKGROUND OF THE INVENTION

1) Field of the Invention

The present invention relates to a mobile accessory storage, security, maintenance and tracking system.

2) Description of Related Art

Assorted businesses provide customers, vendors, and visitors with mobile accessories such as shopping carts, pushcarts, mobility scooters, baby carriages, wheelchairs, or other similar wheeled or mobile conveyances for transporting merchandise and/or persons through a venue, such as an apartment complex, store, casino, hospital or other venue. A very common problem that many establishments that provide these conveyances experience is substantial financial burdens through the loss of such assets, be it through outright theft or simple unauthorized removal from the premises and subsequent abandonment. Further, while venues do their best to clean the various conveyances/accessories, there is no accountability or systematic way of confirming hygienic or other care for mobile accessories.

Various prior attempts have been made to help organize and restrict mobile accessories. For example, U.S. Pat. Pub. No. 2017/0293026, Jones et al., discloses shopping cart corral systems. The example shopping cart corral system includes a corral structure, a radio-frequency transmitter, a radio-frequency receiver, and a controller coupled to the radio-frequency transmitter and the radio-frequency receiver. The controller estimates a quantity of shopping carts disposed in the shopping cart corral based on at least one property of the reflected radio-frequency signal. An example shopping cart counter system includes an elongated structure, first and second electrical contacts, a power source and a processing device. The power source applies a voltage or an electrical current to the first electrical contact and the shopping carts complete an electrical circuit between the first and second electrical contacts. The processing device estimates the quantity of shopping carts disposed in the elongated structure based on an electrical resistance associated with the shopping carts. (Abstract.)

U.S. Pat. Pub. No. 2013/0187755, Rogers et al., provides systems and methods relating to managing shopping cart and other wheeled conveyance assets of an enterprise. More particularly, one aspect of the inventive subject matter relates to using radio frequency identification (RFID) tags and control units to track, manage, and maintain shopping cart and other wheeled conveyance assets of an enterprise, in order to immobilize such wheeled conveyance if an unauthorized attempt is made to move it outside a prescribed use area into a restricted area. In a further aspect of the inventive subject matter, said systems and methods permit authorized uses of such assets to take them into a restricted area. (Abstract.)

U.S. Pat. Pub. No. 2012/0212321, Keener et al., provides a system and method for managing access to a plurality of carts. A plurality of users may be created in a database, each user having unique identifying information. Users may be grouped into user groups when having similar attributes. Each cart may have an entry in the database with associated attributes. Carts may be grouped into cart groups for carts having similar attributes. Users may be given access to cart either individually, through a user group that has access to the cart, by given access to an entire group of carts, or through a user group that has access to an entire group of carts. The various associations can be interwoven to provide groups and sub-groups for managing applications where multiple users must interact with multiple carts. The carts can store access logs which may be communicated in real time to a computing device or may be stored locally at the cart for later access by an administrator. (Abstract.)

U.S. Pat. Pub. No. 2012/0019393, Wolinskey et al., discloses a system and method for tracking a shopping cart in a retail store that includes communicating signals into the pathways from multiple locations, where the signals may include identifiers indicative of location of respective signals. The communicated signals with the identifiers may be received, and the identifiers may be recorded. The recorded data may be processed to determine a path taken by the shopping cart through the retail store. The path of the shopping cart taken through the retail store may be presented to a user. (Abstract.)

U.S. Pat. Pub. No. 2018/0010915 provides a vehicle that may include: a sensor configured to sense a marking, wherein the marking is at least substantially not visible to the human eye under a natural lighting condition; and a localization circuit configured to determine a location of the vehicle based on the sensing of the sensor. (Abstract.) Various embodiments may enable self-rebalancing of vehicle fleets and/or may enable self-delivering packages. ['915 at ¶ 0040]

U.S. Pat. No. 9,684,911, Audet, discloses a method and a device for providing a number of rental vehicles at a station, determining at least one of a number of rental vehicles available at the station and a number of vehicle-receiving spaces available at the station, and sending the at least one of a number of rental vehicles available at the station and a number of vehicle-receiving space available at the station to a user. A distance and historical use of stations are also considered to suggest preferred stations and provide incentives associated therewith. A graphical user interface and a systems adapted to carry the method are also provided hereby. (Abstract.)

WO 2006/053381, Tymms, et al., provides a shopping trolley management system that comprises a plurality of shopping trolleys, each trolley being fitted with a trolley locking member. The shopping trolleys are of conventional design comprising a shopping basket mounted on a wheeled trolley frame. The trolley locking member engages with a wheel locking rail (84) when the trolley is returned to a storage bay of the system, to prevent unauthorized removal of the trolley. The trolleys are preferably fitted with an RFID tag for identifying the trolley as an authorized trolley. An electronically released latching mechanism is designed to interact with a trolley wheel to prevent removal of the trolley unless payment of a designated monetary value is made. A card management unit receives payment of a designated monetary value from a value card when a shopper wants to remove a trolley from the trolley storage bay, and credits the designated monetary value to the value card when an authorized trolley is returned.

As shown above, various attempts have been made to help keep track of mobile accessories. The reasons for doing so are myriad. In one instance, wheelchairs, which are a staple of hospitals, urgent care centers, assisted living environments, etc., account for eighty two percent (82%) of care transitions in these facilities. Yet they place significant strain on commercial and manpower resources at these facilities. On average, it takes a staff member at a hospital fifteen (15)

minutes to locate a wheelchair to transport a patient. It has been estimated that an average hospital system may spend approximately $129,000 per year searching for wheelchairs to use for transport. Further, on average, a hospital system will spend approximately $40,000 per year replacing lost or stolen wheelchairs. Indeed, measured by volume, access to wheelchairs is the number one complaint experienced by medical centers.

Further, wheelchairs are often deposited randomly throughout their respective use environments, as well as handled by numerous employees/contractors, such as nurses, techs, LPNs, volunteers, transport personnel, PAs, etc. This increases the possibilities for contamination of the wheelchair as well as increases the likelihood that vectors may be communicated or transferred from one person to another. Approximately 1.7 million Healthcare-Associated Infections (HAIs) occur in America's hospitals each year. Roughly five in every 100 patients admitted to the hospital contract an HAI. Not only do HAIs impact the health of patients, their outcomes and quality of life, but they are also costly. HAIs account for an estimated $28 million to $33 million in unnecessary cost each year, according to the Centers for Disease Control and Prevention.

Many HAIs are preventable. Standardized, evidence-based infection prevention efforts can greatly reduce the occurrence of HAIs. In fact, one CDC estimate found that up to $31.5 billion in costs could be removed from the delivery system through better infection control practices. Infection preventionists, charged with educating healthcare providers on techniques to reduce infection, draw upon a variety of best practices to promote HAI awareness and risk prevention practices. However, one area that is often overlooked, but presents a significant opportunity to reduce infection risk, is the disinfection of mobile equipment.

Mobile equipment, such as wheelchairs, IV poles and computers/workstations on wheels, are touched thousands of times every day by patients, visitors and staff. As this occurs, pathogens can spread from the individual to the equipment, and vice versa, and bacteria spreads from one area of the hospital to another. Numerous studies have shown that hospital surfaces and frequently used medical equipment become contaminated by a variety of pathogenic and non-pathogenic organisms. Common human pathogens, such as methicillin-resistant *Staphylococcus aureus* (MRSA), vancomycin-resistant *Enterococcus* (VRE), *Clostridium difficile, Acinetobacter* species, and noroviruses can survive for prolonged periods on hospital equipment.

According to the CDC, "surfaces frequently touched by hand potentially could contribute to secondary transmission [of infection-causing bacteria] by contaminating hands of healthcare workers or by contacting medical equipment that subsequently contacts patients." Proper decontamination of mobile equipment, therefore, plays an important role in stopping the spread of HAIs. Yet, hospitals often fall short when it comes to disinfecting these surfaces. Procedures and practices for disinfecting mobile equipment vary greatly among facilities, if they are in place at all. In a study in the September 2012 issue of Infection Control and Hospital Epidemiology, researchers observed that only 50 percent of high-touch surfaces in the operating rooms at a 1,500-bed teaching hospital were cleaned properly. Some of the surfaces sampled included "anesthesia-related equipment—keyboards, knobs, switches, oxygen reservoir bags and adjacent medication drawers—bed control panels, Mayo stands, intravenous poles, intravenous pumps, OR entry doors, overhead lamps and the floor." In 2013, researchers in Israel identified that "wheelchairs are contaminated by several pathogenic bacteria, among them antibiotic resistant strains." Peretz, et al. (2013 Aug. 11). Do Wheelchairs Spread Bacteria within hospital walls? *World J Microbiol Biotechnol*.

Accordingly, it is an object of the present invention to provide a system for ensuring mobile accessories, such as shopping carts, push-carts, mobility scooters, baby carriages, wheelchairs, or other similar wheeled conveyances, return to designated storage places, that contact between the devices and persons is kept to a minimum to increase hygiene, to limit the "disappearance" whether intended or accidental of mobile devices, and to optimize storage of the devices at a facility.

SUMMARY OF THE INVENTION

The above objectives are accomplished according to the present disclosure by providing in a first embodiment, a mobile accessory storage and security system. The system may include a security rail comprising a single ingress/egress opening, a detention end, and a security space defined between the single ingress/egress opening and the detention end, at least one sensor disposed on the security rail to receive a signal from a transmitter, a locking mechanism for securing a movement feature of a mobile accessory within the security space, and an access device for allowing removal of the mobile accessory from the security space. Further, the system may include a second sensor is present on the security rail. Still further, the security space may include opposing engagement leafs that define an engagement opening there between. Further yet, movement of the movement feature within the security space may be limited to linear movement substantially along a single axis extending between the single ingress/egress opening and the detention end. Still yet further, a user interface in electronic communication with the security rail, at least one sensor, and access device may be provided. Again further, the at least one sensor may be disposed within the security space of the security rail. Again still, multiple mobile accessories may be secured simultaneously within the security rail. Again still further, the system includes at least one sanitizing element. Further yet again, the sanitizing element may be in electronic communication with the system.

In an alternative embodiment, a method for storing, tracking, and regulating upkeep with respect to mobile accessories is provided. The method may include providing at least one security rail comprising a single ingress/egress opening, a detention end, and a security space defined between the single ingress/egress opening and the detention end, providing at least one sensor disposed on the security rail to receive a proximity signal from a mobile accessory transmitter, providing at least one user interface, wherein the interface is in electronic communication with the security rail and the at least one sensor, providing a network and a server, wherein the server is in electronic communication with the at least one security rail and the at least one user interface, establishing a security rail identifier for each security rail and entering same into the network, establishing a mobile accessory identifier for each mobile accessory and entering same into the network, establishing an authentication protocol for allowing mobile accessories to be removed from the at least one security rail and entering same into the network, authentication by the server, via the authentication protocol, of an access request made at the user interface, the least one security rail and at least one user interface may be configured such that: when the server authenticates the access request made at the user interface; and the at least one sensor receives the proximity signal from the mobile accessory transmitter, a releasable lock may be moved from a locked position to an unlocked position to allow the at least one mobile accessory to be removed from the at least one security rail. Further, multiple security rails may exist within the network and communicate with the server. Still further, a sanitizing feature may be provided. Further yet, information regarding use of the sanitizing feature may be input as the mobile accessory is being released from the security rail. Further again, the authentication protocol may include reading an employee identification badge. Again still, the authentication protocol may include paying for access to at least one mobile accessory contained within the security rail. Again yet, the user interface may identify the mobile accessory as docked, if the mobile device is engaged with the security rail and entering same into the network. Further still, the mobile accessory may be identified as in use, if the mobile device is being released from the security rail. Again yet, a second sensor may be present on the security rail. Further again, movement of the movement feature within the security space may be limited to linear movement substantially along a single axis extending between the single ingress/egress opening and the detention end.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 shows a close-up view of one embodiment of a user interface of the current disclosure.

FIG. 8B shows one embodiment of an example notification screen displaying a time notification indicating when a mobile accessory will arrive at the security rail from which the request initiated.

Figure 1:
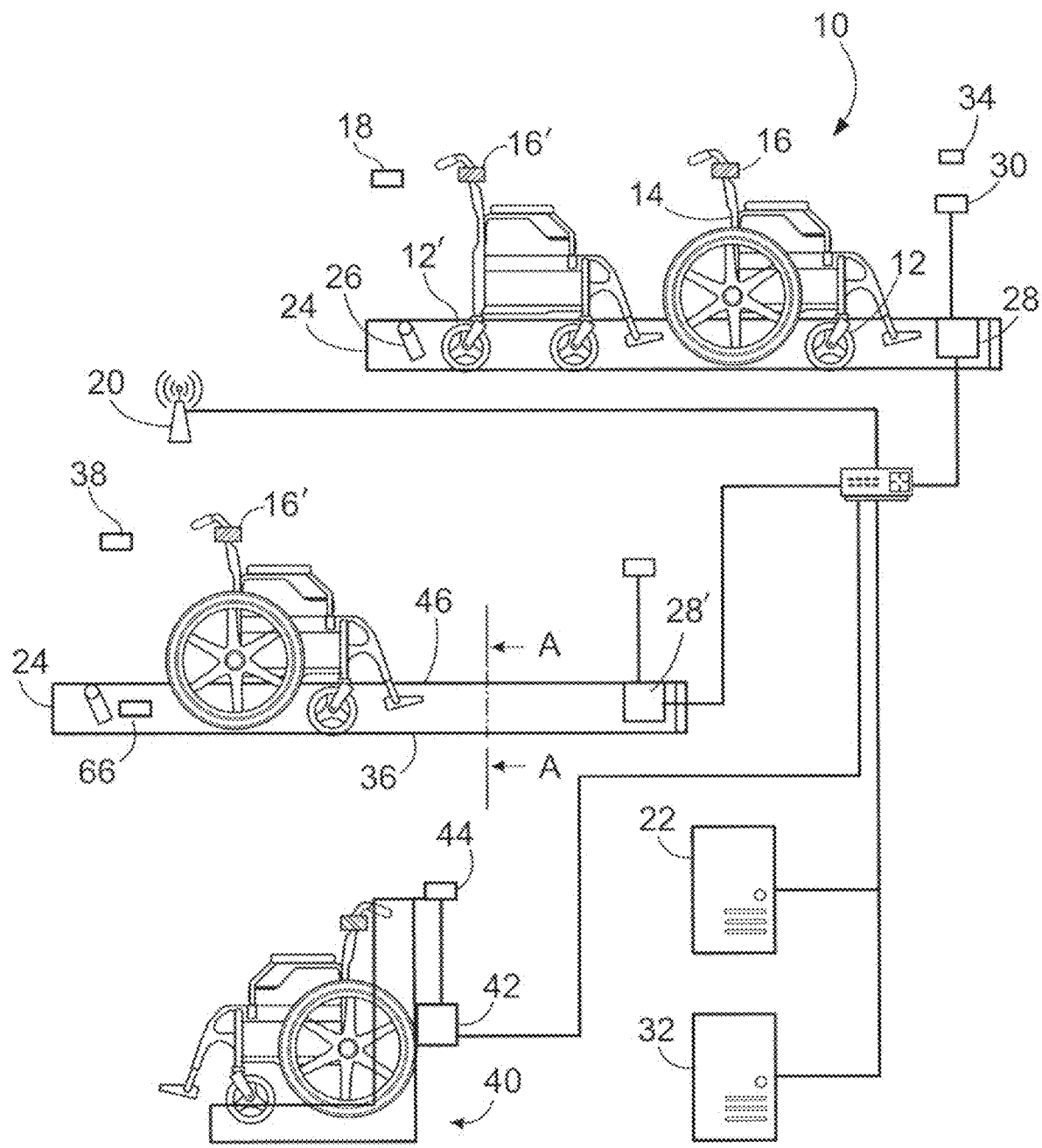
FIG. 1 shows one embodiment of a storage carriage of the present disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

In one instance, the current disclosure may provide a system for organizing and better understanding mobile accessory use. Indeed, the current disclosure may assist with security, sanitation, time gains/efficiency, accountability of resources, real time information flow, patient flow, asset and patient tracking, resource availability, transparency and a reduction of infection or contaminated mobile accessories. In one embodiment, a facility may register all of its mobile accessories into a database. Via use of the proprietary technology disclosed herein, a facility may store, track, clean and manage all aspects of its mobile accessories.

Referring to FIG. 1, a first mobile accessory 10 is shown having a front wheel 12 attached to a mobile accessory frame 14. While a wheelchair is shown in FIG. 1, the current disclosure is not so limited. Essentially any mobile accessory may be used with the current disclosure with a wheelchair simply used for purposes of example only and not intended to be limiting. Other possible mobile accessories include shopping cards, luggage carts, luggage bags, etc. First mobile accessory 10 may include a frame transmitter 16, which may be an electronic transmitter such as an active RF transmitter, AM/FM transmitter, passive RF transmitter, etc., with a unique identifier. When frame transmitter 16 passes over or near frame receiver 18, frame receiver 18 may detect frame transmitter 16 indicating that a mobile accessory 10 has been added to or removed from storage carriage 24. In one state, a wheelchair, associated with the unique frame transmitter, can be in a stored state so that when the wheelchair passes by the frame receiver, the wheelchair can be toggled to a deployed state. When the wheelchair is in the deployed state, and the frame transmitter passes by the frame receiver, the wheelchair can be toggled to the stored state. Therefore, computer system 22 may determine the current state, stored, or deployed, for each wheelchair as the computer system can be in electronic communications with the various components of the storage carriage. Further, storage carriage 24 may include a unique identifier, as well as physical location information so that the wheelchair can be associated with a particular storage carriage. At any given time, the location of the wheelchair can be known if it is stored in a storage carriage or at least the last storage carriage associated with the wheelchair can be determined.

The frame transmitter associated with the wheelchair can also include a location transmitter that, when operatively associated with a location receiver 20, can determine the physical location of the wheelchair within a facility. The physical location can be provided by determining the proximity to a receiver, GPS, triangulation, by using the known location of the receiver and/or signal strength, or other means. In one embodiment, the storage carriage can include a lock 26 that can be in a locked position preventing one or more wheels, such as 12 or 12', being removed from storage carrier 24 until lock 26 is in an unlocked position. Lock 26 may be in electronic or physical communication with a carriage controller 28 which may position lock 26 between its unlocked and locked states. In one embodiment, an individual can use release 30 to indicate to carriage controller 28 that lock 26 should be unlocked. Release 30 may be mechanical, electrical, or electromechanical.

In one embodiment, the release can be in electronic communication with personal computer system 32. Personal computer system 32 may include employee or independent contractor information with access control associated with an access card 34. Access card 34 may be one associated with a healthcare worker or a temporary access card associated with a patient or visitor. When the individual places access card 34 at or near release 30, release 30 may receive identification information associated with the individual attempting to access storage carriage 24. The individual authorization to remove mobile accessories from storage carriage 24 may be limited to physical locations such as floors, areas of the facilities such as wings, or specific storage carriages 24. Further, the ability to track who removes and deploys a mobile accessory adds accountability to the use of the mobile accessory reducing loss, theft, and or misplacement of mobile accessories.

The identification information can be transmitted from carriage controller 28 to personal computer system 32 with an inquiry as to whether the individual is allowed to access mobile accessories in a specific storage carriage 24. If so, lock 26 may be released. When first mobile accessory 10 passes by frame receiver 18, lock 26 may be placed in a locked position 35 to prevent additional mobile accessories from being removed from storage carriage 24. In this embodiment, computer system 22 can receive and store for subsequent retrieval the specific mobile accessory 10, the specific storage carriage 24 and the specific individual that released the mobile accessory for removal.

Mobile accessory 10 may be returned to a second storage carriage 36. When the frame transmitter 16' passes by second storage carriage frame receiver 38, the controller 28' for second storage carriage 36 can inform computer system 22 that mobile accessory 10 was returned to second storage carriage 36. In one embodiment, the individual returning mobile accessory 10 can actuate release 30 and computer system 22 can also capture the identification information of the individual returning mobile accessory 10. In one embodiment, lock 26 can be configured to allow mobile accessory 10 to be placed in either storage carrier 24 or 36 without having to unlock lock 26.

In one embodiment, cleaning station 40 can include cleaning station controller 42. Cleaning station frame receiver 44 can be associated with cleaning station 40 so that when mobile accessory 10 is placed at or near cleaning station 40, frame receiver 18 can identify mobile accessory 10 by reading frame transmitter 16 associated with mobile accessory 10. Once identified, computer system 22 can receive information that mobile accessory 10 has been placed in cleaning station 40. While cleaning station 40 is shown as separate from storage carriage 24, cleaning station 40 may also be integral with storage carriage 24 and may even be storage carriage 24 in other embodiments. In one embodiment, the system can track the deployment and storage of the wheelchair, the length of time the wheelchair is in the deployed state, the location of the wheelchair, and provides suggested time and/or intervals when the wheelchair should be taken to the cleaning station.

In one embodiment, storage carriage 24 may be permanently fixed to a physical location. In an alternative embodiment, storage carriage 24 is movable as needed with electronic communications performed wirelessly.

Figure 2:
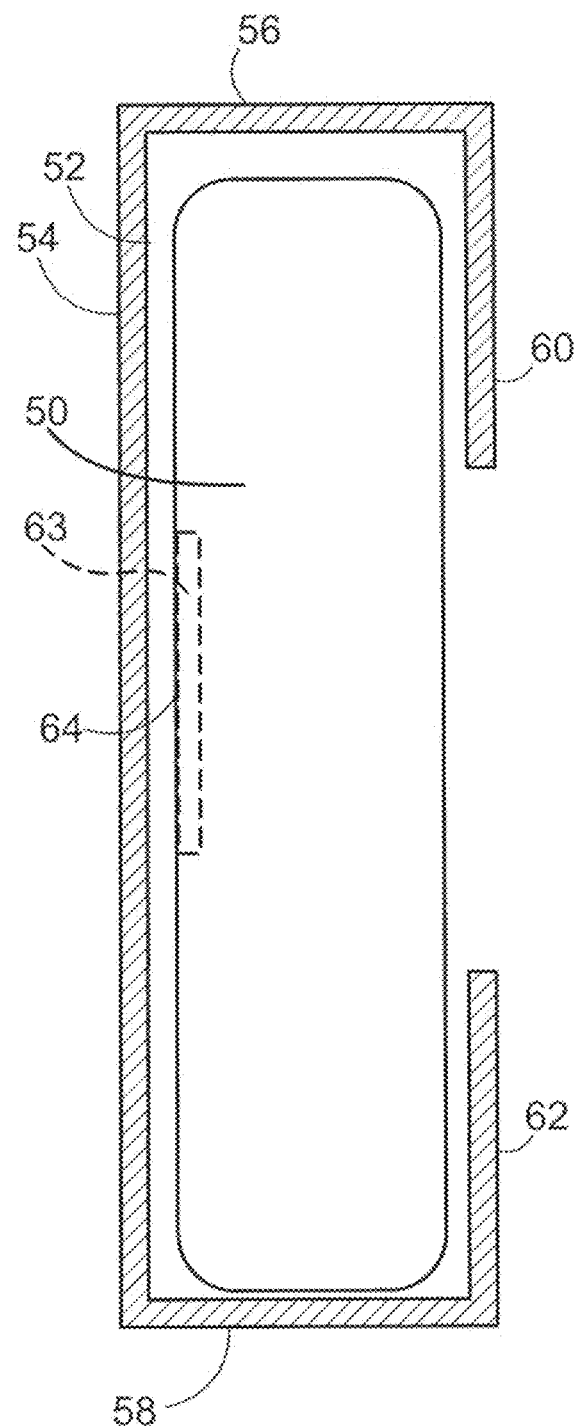
FIG. 2 shows a cross section of a rail of one embodiment of the disclosure.

Referring to FIG. 2, cross section of rail 46, see FIG. 1, along plane A-A is shown. Wheel 50 of mobile accessory 10, not shown, is received inside travel path 52 defined by side wall 54, top wall 56, bottom wall 58, top flange 60, and bottom flange 62. Detention end 25, see FIG. 1, of rail 46 may be capped, blocked, or otherwise designed to prevent wheel 50 from passing entirely through rail 46 such that rail 46 only allows one-way ingress and egress into and out of rail 46. Lock 26 may be disposed at ingress/egress end 27 so that wheel 50 may be captured in rail 46 and only removed or deployed when lock 26 is in an unlocked position. In one embodiment, mobile accessory 10 may include wheel transmitter 64 that can transmit to rail receiver 66 (see FIG. 1) allowing storage carriage 24 to receive information identifying specific mobile accessories. Wheel transmitter 64 can be attached at mobile accessory frame 14 at or near wheel 12 or 50, incorporated into wheel 12 or 50, or wheel transmitter 64 may be on hub 63 of wheel 50.

Figure 3:
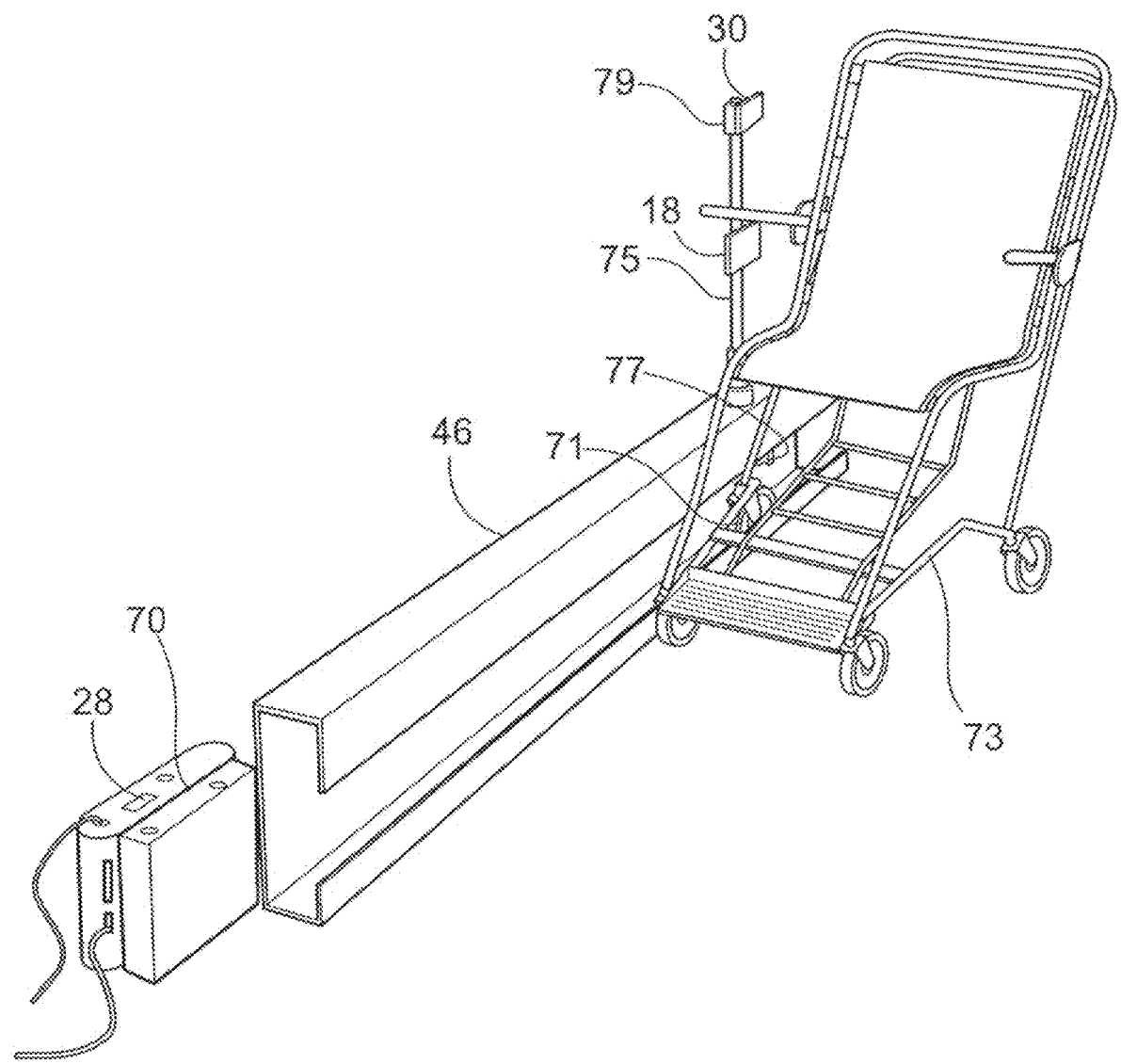
FIG. 3 shows a perspective view of a storage carriage of the current disclosure.

Referring to FIG. 3, rail 46 is shown receiving rear wheel 71 of seating mobile accessory 73. Frame receiver 18 is shown affixed via support 75, which also supports release 30. Storage carriage controller 28 can be in electronic communication with frame receiver 30, lock 77, computer system 79 and a power source 70. Mobile accessories may be configured to be nested within or superimposed with respect to one another when placed within rail 46 to allow for rail 46 to receive multiple mobile accessories, not shown.

Figure 4:
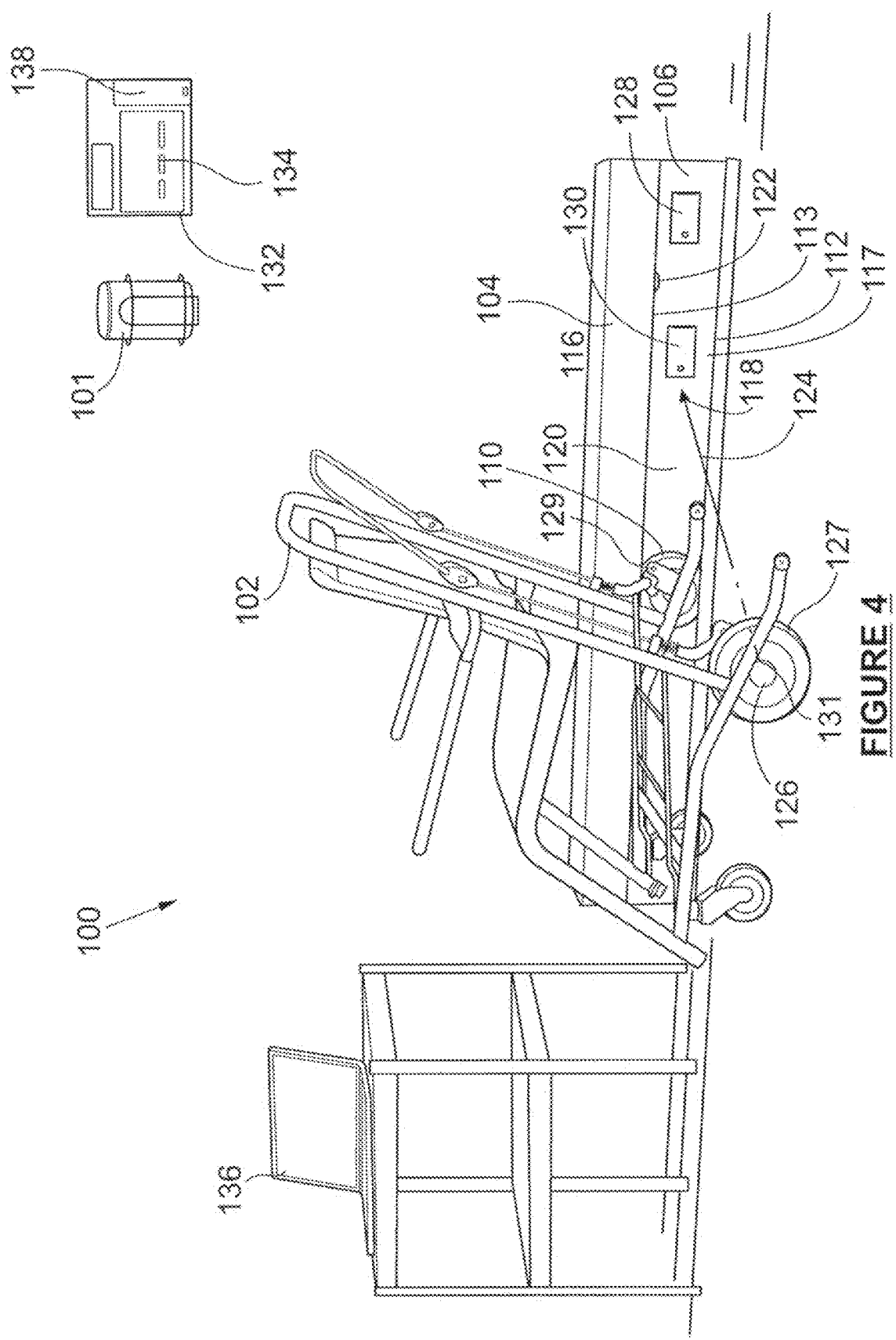
FIG. 4 shows one embodiment of a mobile accessory storage and tracking system of the current disclosure.

Referring to FIG. 4, one embodiment of a mobile accessory storage and tracking system 100 is shown. Mobile accessory 102 is shown engaged with security rail 104; security rail 104 may be positioned substantially parallel with respect to a floor of the building wherein security rail 104 is installed. Thus, security rail 104 may be positioned substantially horizontally but may also be installed at angles other than parallel to the floor. Security rail 104 includes accessory access ingress/egress port 106 as well as accessory detention end 108.

The design of the current system is elegant in its simplicity. While horizontal movement of mobile accessory 102 along a single axis, defined with respect to security rail 104, is permitted by allowing movement feature 110, wherein the movement feature may be a wheel, ball roller, strut, skid, tread, or other apparatus for movement, to freely move/slide/rotate within security space 112, defined by interior 114 of security rail 104, once movement feature 110 of mobile accessory 102 is confined within security space 112 by being at least partially enclosed by upper engagement leaf 116 and lower engagement leaf 118, mobile accessory 102 is prevented from moving out of plane 120 defined by security space 112 and security rail 104. To wit, mobile accessory 102 may move linearly along the X-axis of security rail 104 between releasable lock 122 and detention end 108 but movement along the Y-axis with respect to security rail 104 is prevented by upper engagement leaf 116, lower engagement leaf 118 and security rail side wall 124. In one embodiment, upper engagement leaf 116 and lower engagement leaf 118 are positioned opposite one another forming an engagement opening 117 there between. Engagement opening 117 may be of various dimensions wherein the engagement opening 117 is sized to allow movement feature 110 of mobile accessory 102, such as a wheel, ball roller, strut, skid, tread, or other movement apparatus, to be restrained within security space 112 via a portion of the movement feature fitting within engagement opening 117 and into security space 112 but unable to be removed from security space 112 without operating of releasable lock 122.

Thus, once a user places mobile accessory 102 within security rail 104, via engagement with movement feature 110, which may include security transmitter 126 (while shown on outer movement feature 127, security transmitter may be on inner movement feature 129, or a transmitter may be on both movement features 127 and 129 to allow for placement of security rails on opposing walls of a structure, the distance of transmissions from transmitter 126 may be defined and limited as known to those of skill in the art) security transmitter activates first sensor 128 via a proximity signal 131, shown by an arrow, which disengages releasable lock 122 to allow movement feature 110 to pass under releasable lock 122, which may be spring tensioned or otherwise formed such that movement feature 110 may push lock 122 upward into a void or opening 115 defined within security space roof 113, located behind upper engagement leaf 116 and forming the "top" of security space 112, to allow movement feature 110 to pass by releasable lock 122, once movement feature 110 passes second sensor 130, releasable lock 122 reengages by being locked into position via re-extending from security space roof 113 and re-extending at least partially into security space 112, to securely contain movement feature 110 within security space 112. When removing mobile accessory 102, security transmitter 126 would pass second sensor 130, which then unlocks releasable lock 122 allowing movement feature 110 to pass under lock 122, and releasable lock 122 would reengage once security transmitter 126 passes first sensor 128.

This arrangement prevents a user from "gaming" the security device by trying to remove more than one mobile accessory 102 at a time. The two sensor arrangement only allows one security transmitter 126 to pass at a time before reengaging lock 122. However, an emergency override may be included with the system to allow all mobile accessories 102 to be removed at once, such as in the case of an emergency or peak demand times when multiple mobile accessories are immediately required.

System 100 may also include a user interface 132 with a touchscreen 134, or other input device as known to those of skill in the art, as well as mobile accessory computer system 136, while shown as a laptop, mobile accessory computer system 136 may be a desktop computer or incorporated into a larger computer system, such as a hotel, hospital, apartment complex, casino, etc., not shown. System 100 may also include access device 138, such as a security card reader, keypad, or other device as known to those of skill in the art, to control access to mobile accessory 102 by using employee identifiers to determine who may or may not remove mobile accessories 102 from security rails 104.

Figure 5:
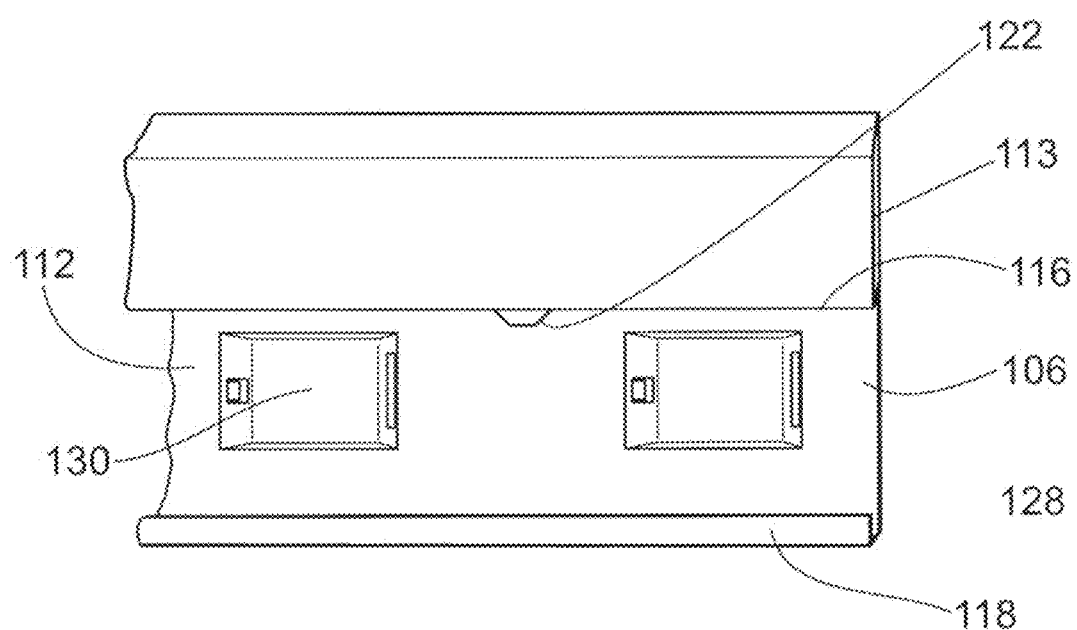
FIG. 5 is a close-up view of ingress/egress port, releasable lock, first sensor, and second sensor of the current disclosure.
Figure 6:
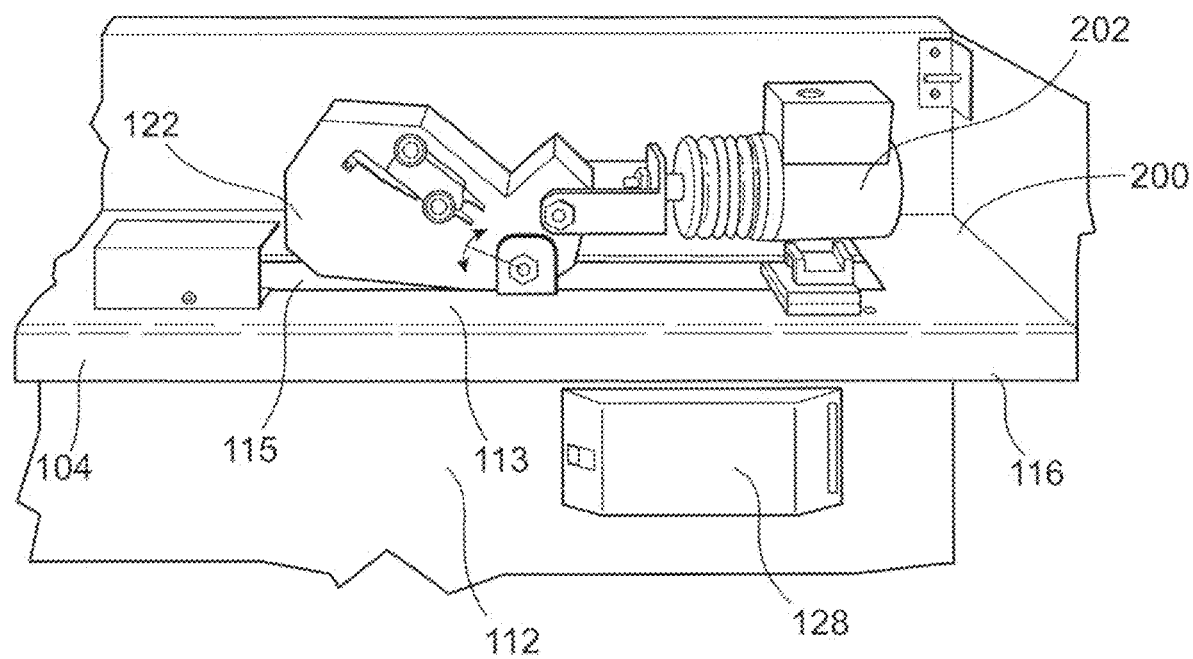
FIG. 6 is an internal view of a locking mechanism for activating and deactivating releasable lock.

FIG. 5 is a close-up view of ingress/egress port 106, releasable lock 122, first sensor 128, and second sensor 130. FIG. 6 is an internal view of locking mechanism 200 for activating and deactivating releasable lock 122. Here, a solenoid 202 may serve to move releasable lock 122 into and out of security space 112, by raising and lowering releasable lock 122 through void 115 in security space roof 113 so that a movement feature 110 may move past releasable lock 122 when entering or leaving security rail 104. In one instance, solenoid 202 may comprise a solenoid valve, containing an electromechanical solenoid which actuates either a pneumatic or hydraulic valve in order to effectuate movement of releasable lock 122. In one embodiment, once a positive user acceptance has occurred, power may be sent from the main control board to two locations, the first being an anti-theft solenoid, which may activate and release. The second signal may be sent to a time-delayed relay, which may then activate the main solenoid. This allows an asset to be removed from the system. The lock may remain in the open position until an asset has been removed from the device or predetermined time has elapsed. FIG. 7 shows a close-up view of user interface 132.

Figure 8A:
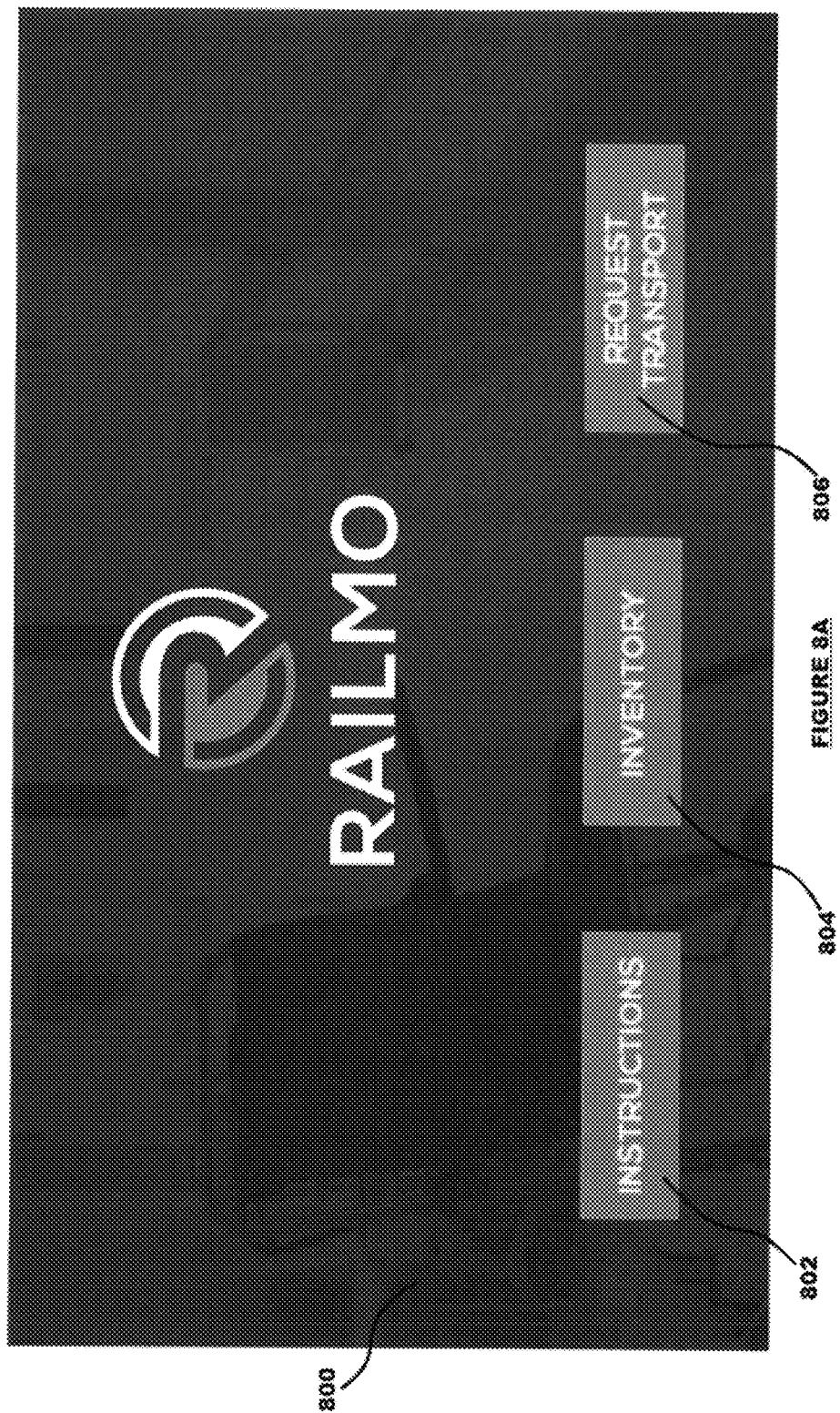
FIG. 8A shows one embodiment of an introductory screen of the current disclosure.

FIGS. 8A-8H show various user screens that may be provided by user interface 132. FIG. 8A shows introductory screen 800 wherein a user may receive instructions 802 on how to use system 200, for instance the RAILMO™ system offered by RAILMO, LLC, Columbia, S.C., an inventory menu 804 to view the location of all mobile accessories across all security rails in the overall mobile accessory infrastructure, and a request transport function 806 that may be used to signal that a mobile accessory 102 should be brought to a particular security rail 104 from which user interface 132 makes the request. FIG. 8B shows an example notification screen 820 displaying a time notification 822 indicating when a mobile accessory 104 will arrive at the security rail 104 from which the request initiated.

Figure 8C:
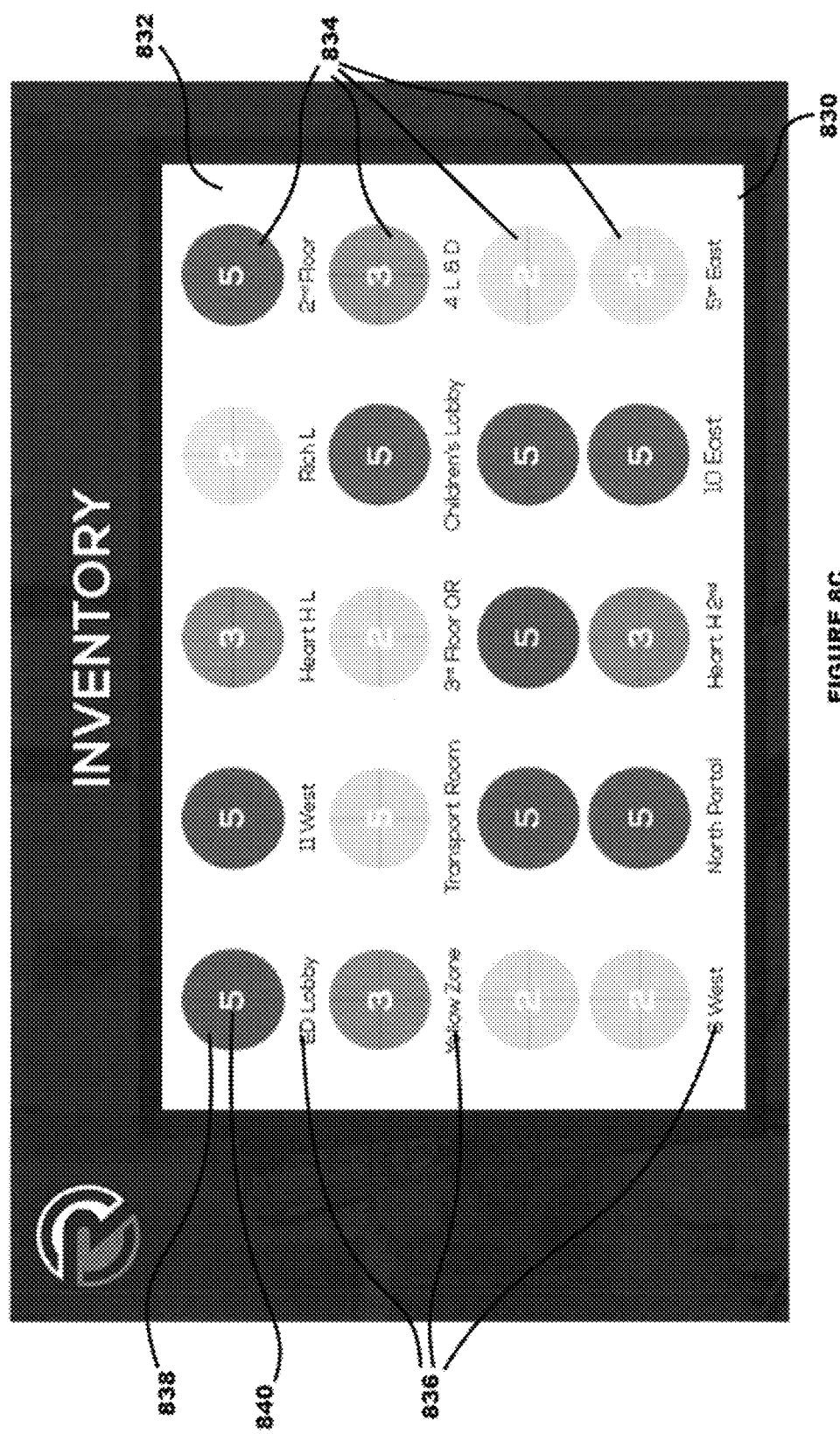
FIG. 8C illustrates one embodiment of an inventory screen of the current disclosure.

FIG. 8C illustrates an inventory screen 830. Inventory screen 830 may be used to show the location of all mobile accessories 102 in the overall mobile accessory infrastructure 832, which may be defined as all mobile accessories 104 with transmitters 126, all security rails 104, as well as their associated user interfaces 132, and any mobile accessory computer system 136, which may be a stand-alone system or incorporated into an existing system. In one embodiment, the basic computer setup for a Railmo system may comprise: (1) internal computer system; (2) server at system level; and (3) main server maintained by Railmo either on the cloud and/or at a physical location at Railmo. Further, single systems may omit item 2.

In one non-limiting example provided for purposes of explanation only, a user may access inventory screen 830 to view mobile accessory infrastructure 832. As FIG. 8C shows, the user is provided with a visual representation 834 of all security rails 104 within infrastructure 832. Here, for instance, the user sees twenty (20) different security rails 104 with associated identifiers 836. In one embodiment, visual representations 834 may be color coded, such as green for full or very full, orange for partially full, yellow for low, red for empty, etc., to show the number of mobile accessories at each location via a color code 838 as well as a number 840 identifying the number of mobile accessories at each individual security rail 104. For example, at row 1, column 3, a user is informed that at identifier 836, here Heart H L, there are three (3) mobile accessories 102 at that security rail 104 with a color code of orange to show moderate capacity, whereas at row 2, column 3, Third Floor Operating Room, there are only two (2) mobile accessories available and the color code 838 is yellow. Further, multiple rails 104 may be present at a single location, such as shown by rows three and four, wherein two (2) rails 104 are present at each location. For example, the location 10 East has two (2) full rails 104 with five (5) mobile accessories 102 available at each rail 104 for a total of ten (10) available mobile accessories.

Figure 8D:
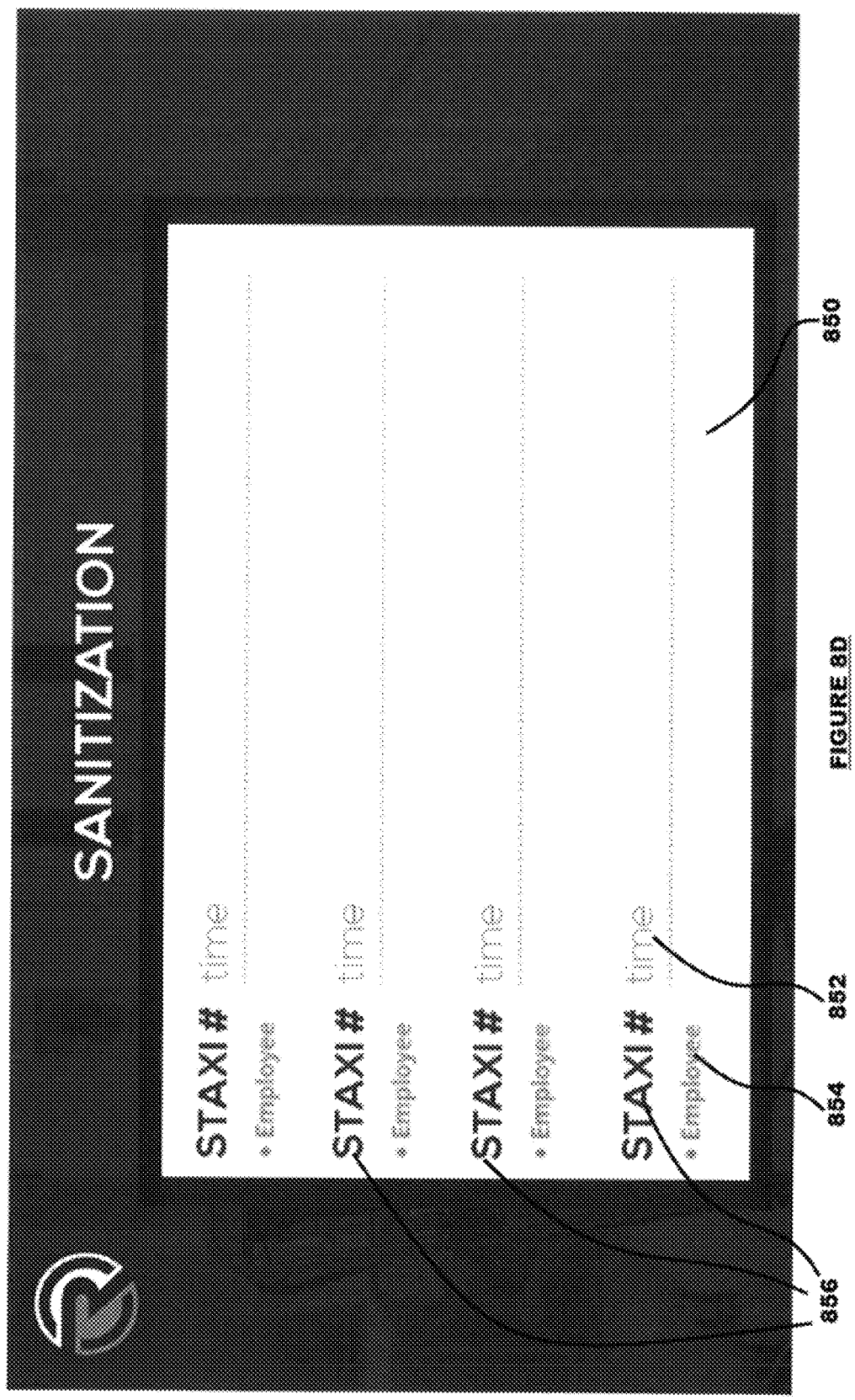
FIG. 8D shows one embodiment of a sanitation screen of the current disclosure.
Figure 8E:
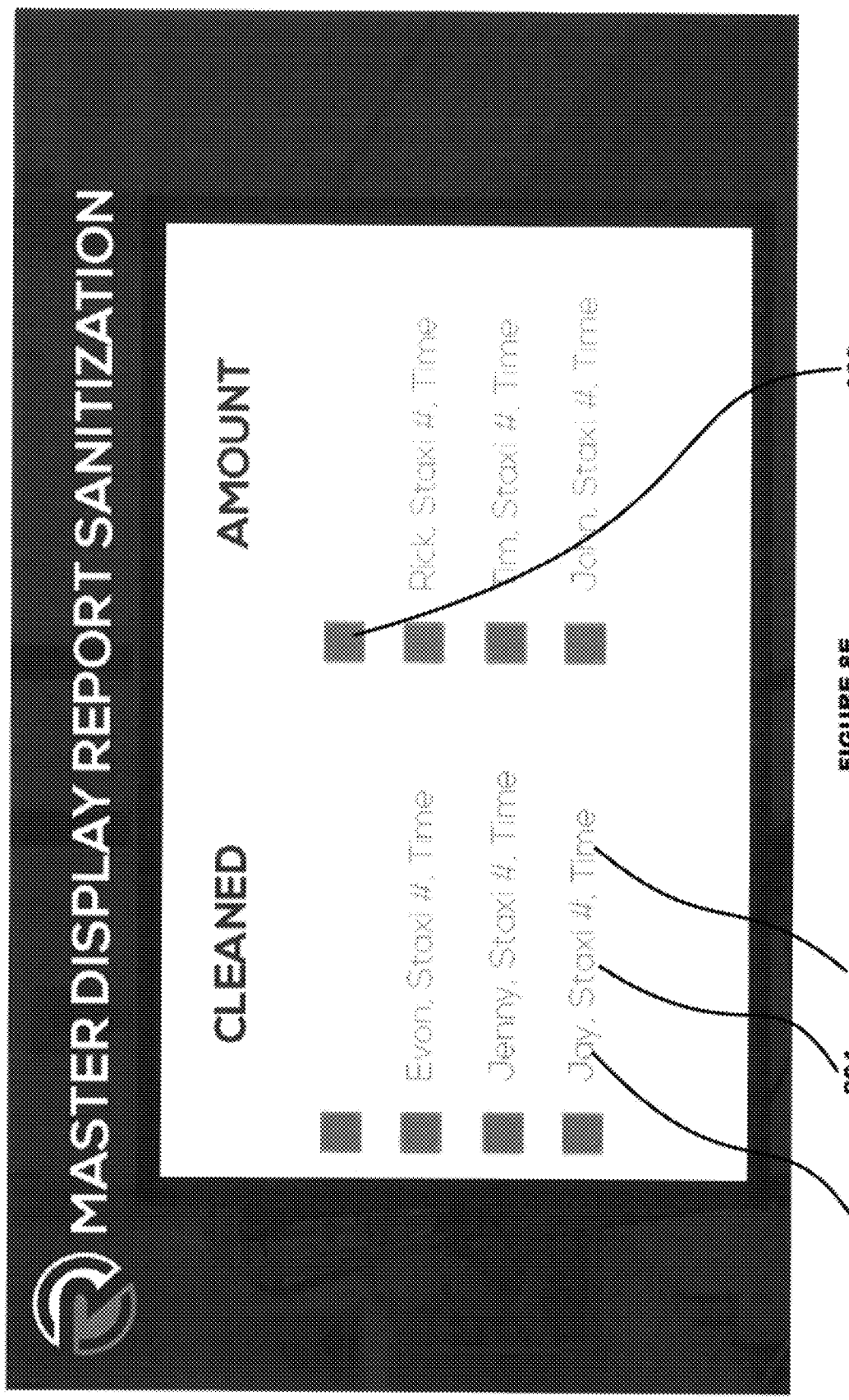
FIG. 8E an alternative sanitation display of the current disclosure.

Another aspect of the current disclosure is employing system 100 to assist with sanitation of mobile accessories 102, see FIG. 8D. For example, interface 132 may provide access to a sanitation scheme 850 wherein a user may determine time 852 when a particular mobile accessory 856 was sanitized and employee 854 responsible for the sanitation procedure. Wheelchairs may be sanitized using infrared light, chemical or cart washing systems. Also, through healthcare certified sanitization wipes. All of which may be end-user provided. Through EVS staff and Clinical staff. Indeed, system 100 may be configured to require that mobile accessory 102 be sanitized as part of docking or returning mobile accessory 102 to security rail 104 requiring an employee to certify via user interface 132 that sanitation was effected for a particular mobile accessory 102. Indeed, system 100 may include sanitation feature 101, see FIG. 1, such as wipes, sprays, gels, sanitizing pads, sterilizing foams, etc., for use in sanitizing mobile accessories 102. Here, sanitation feature 101 is shown as a container of sterilizing wipes, but other sanitation measures are considered within the scope of this disclosure including Railmo's hardwire and software interoperability will give the provider the option of recording sanitization occurrences instantly through the touchscreen units at the point of contact/use for any instance. From a manager/executive level staff, they will be able to pull reports for their own review or during audits from CMS, Joint Commission, DHEC, IHI, Infection control, advisory board, or any agency requesting report of rate cleaning per use of a organizations wheelchair transports and sanitation ratio's in real time. "Wheelchair 23 has been used for 100 different transport in the last 30 days and has been cleaned 28 times". "In the last month Jane Doe has had over 200 transports and has cleaned 200 different wheelchairs before or after each use". Indeed, user interface 132 may issue commands to a user or be in electronic or other communication with sanitizing element 101 to determine if same is accessed. Further, sanitation may be enforced by the system refusing to raise releasable lock 122 until sanitation element 101 is accessed or otherwise used by the user or employee or the use inputs into user interface 132 that sanitation has occurred. Further, sanitation may be enforced for both docking and releasing mobile accessory 102 to ensure maximum sanitation is achieved. FIG. 8E shows an alternative display 860 that displays who 862, such as an employee, used sanitizing features 101 to sanitize a particular mobile accessory 864 and time 866 of the sanitation event. An empty slot 868 can signify that a particular rail 104 is only partially filled and room for inserting other mobile accessories 102 exists.

Figure 8F:
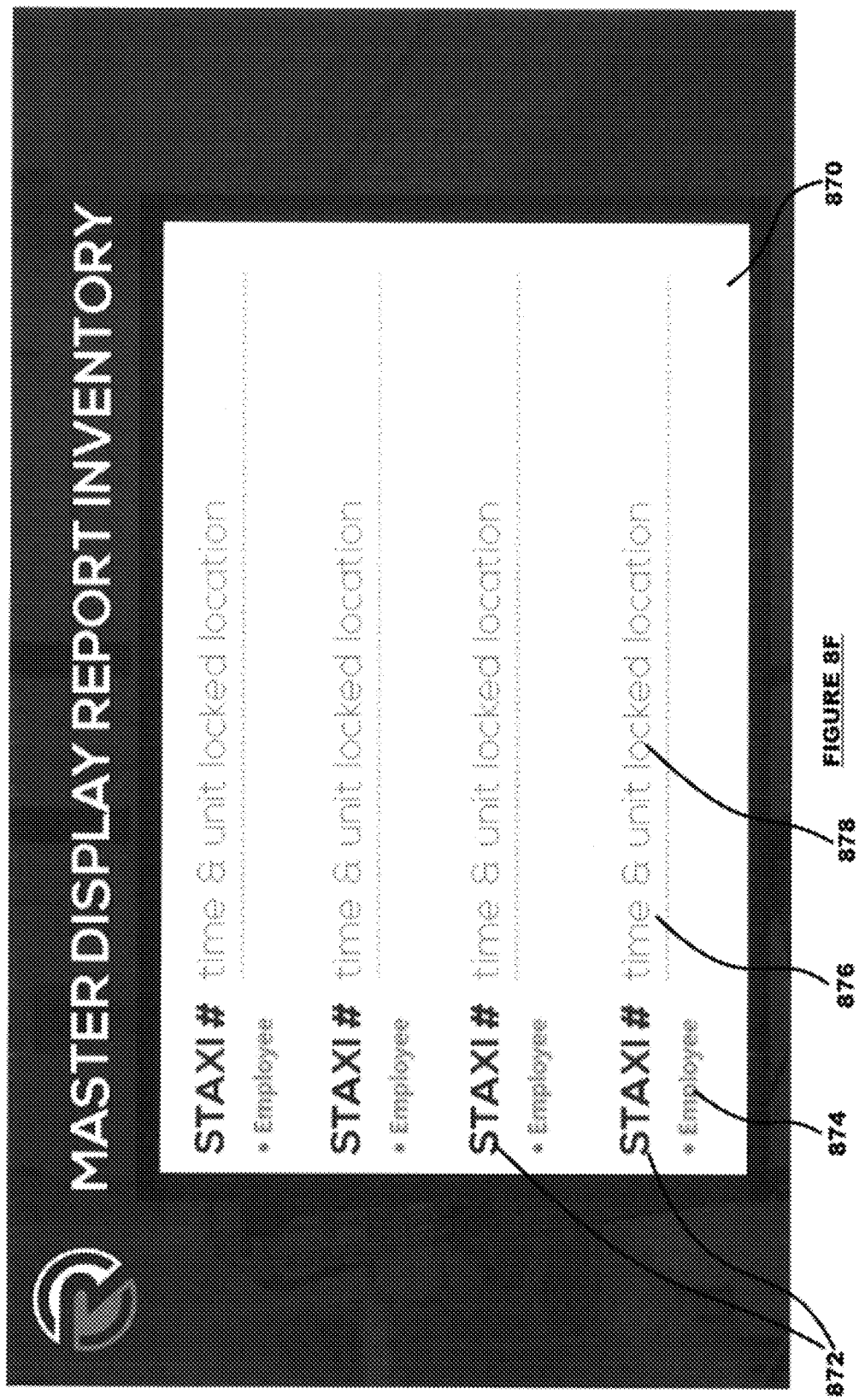
FIG. 8F shows a master display report inventory of the current disclosure.

FIG. 8F shows another possible use of system 100 wherein a user may access a master display report inventory 870 of all mobile accessories 102 contained within mobile accessory infrastructure 832. For example, as FIG. 8F shows, user interface 132, or computer system 136, if the user is at a computer terminal and not at user interface 132, one may see a unit designation 872 for mobile accessories 102 showing the last employee 874 to use that unit as well as time 876 when the unit was docked as well as the rail location 878 where the unit is docked at a security rail 104.

Figure 8G:
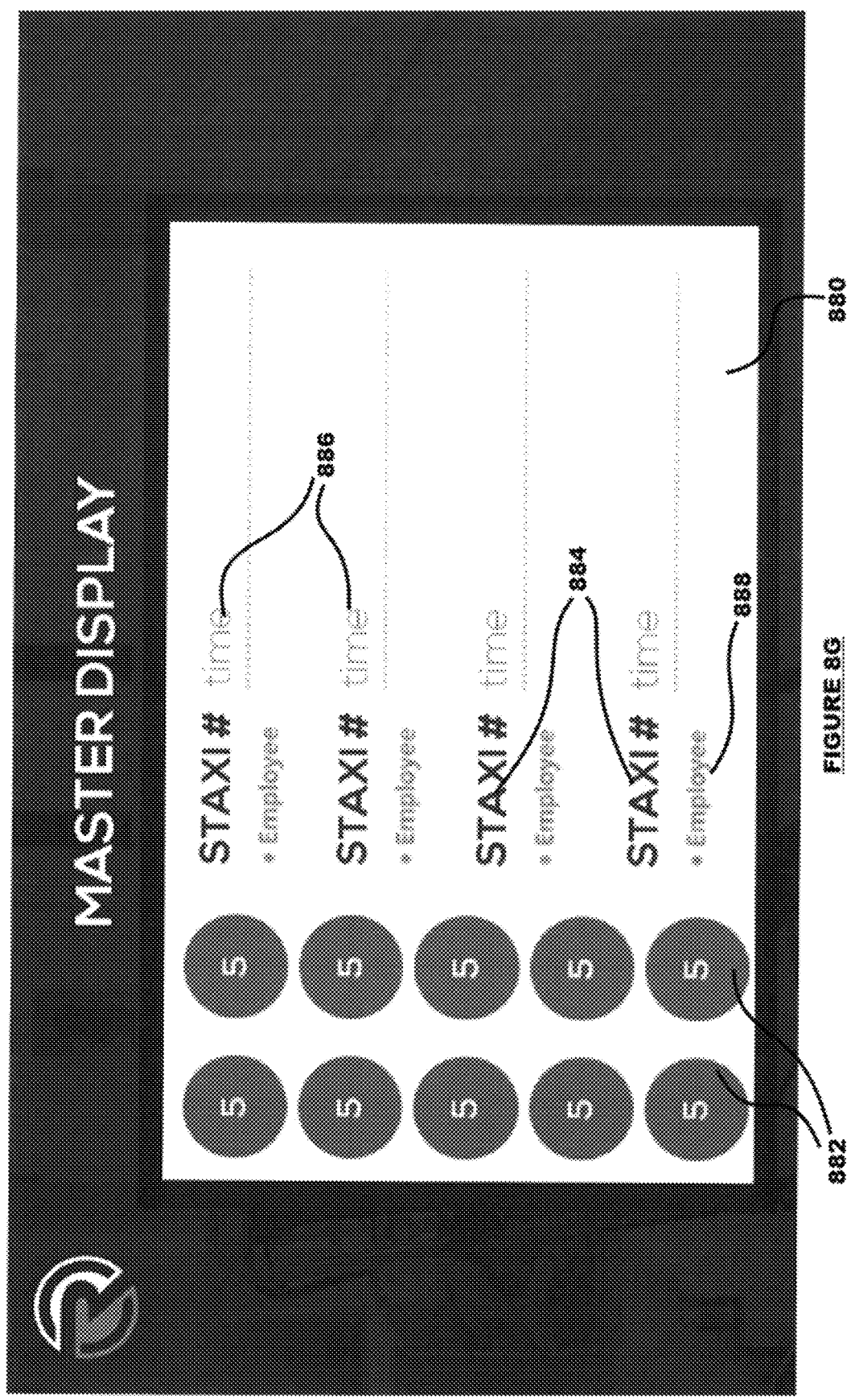
FIG. 8G shows an alternative embodiment of a master display screen.
Figure 8H:
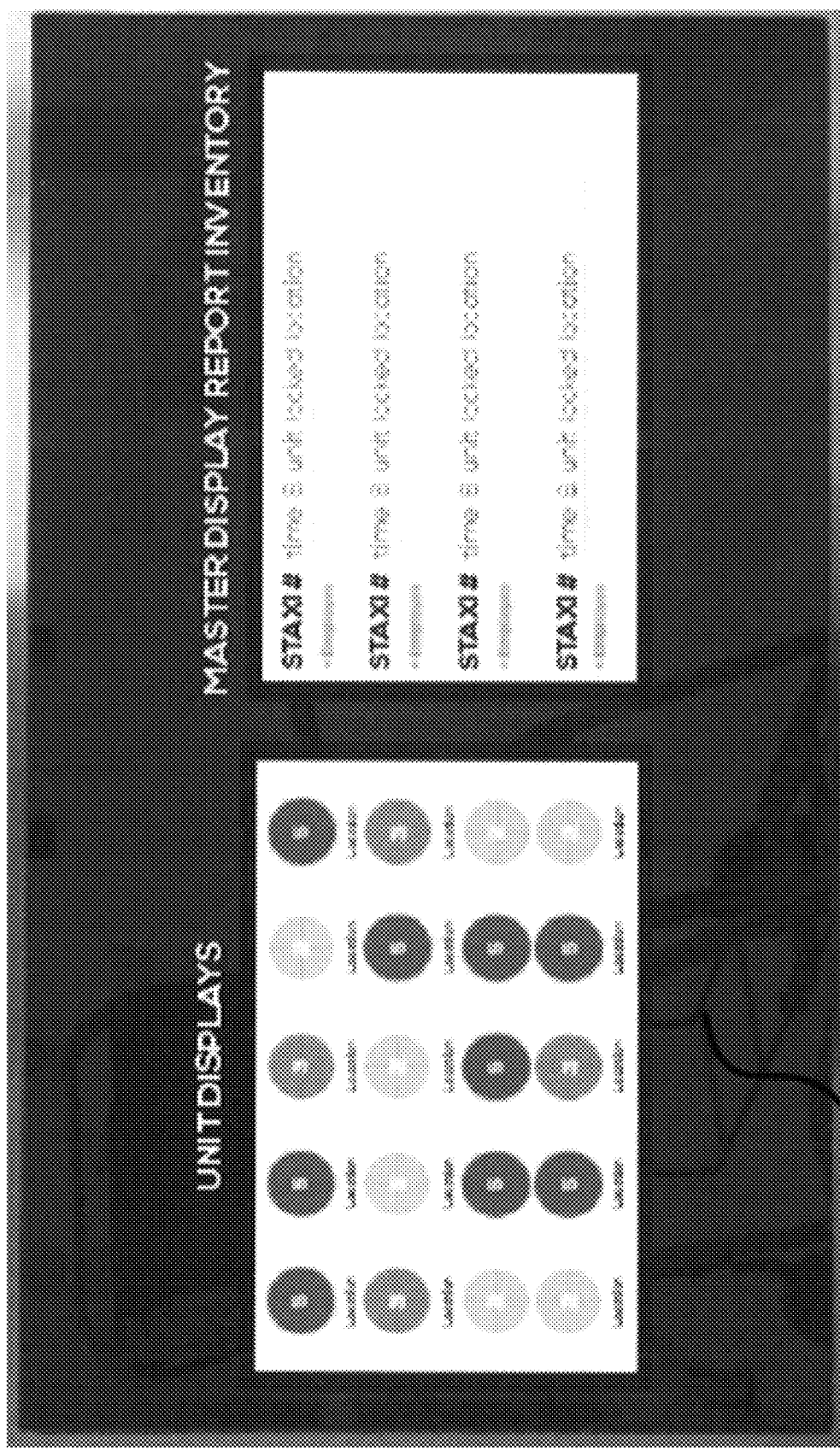
FIG. 8H shows an alternative display screen wherein multiple of the screens 8A-8G may be displayed simultaneously for easier information access.

This allows for accountability of use. If a particular unit is not at a designated rail, the employee last associated with the unit may be located and questioned as to the location of the mobile accessory. FIG. 8G shows an alternative master display 880 that displays number of units at location information 882, which may also be color coded and display a number of units per rail as discussed supra, as well as showing a listing of the status of individual mobile accessories 884, time duration 886, and employee identifier 888 who used a particular unit. Time duration 886 may not only indicate when a particular mobile accessory 102 was docked at a particular security rail 104 but may also include the duration of time between removing the unit from a first rail and subsequently returning it to another rail for docking. The advantages and benefits of tracking use times gives clear real-time transparency for the users. Understanding exactly where, when, and who is utilizing these assets all in real time allows for the best optimization of mobility assets as well as the best service to the patient or individual needing to use a mobility asset. Tracking use times allows for 24/7 security, accountability, and selective access to improve the most efficient process for the end users. FIG. 8H shows an alternative display 890 wherein multiple of the screens 8A-8G may be displayed simultaneously for easier information access.

The operating software of the current disclosure, in one instance RTLS available from Railmo, Columbia, S.C., has numerous, functions, features, displays, and tracking capabilities. The software collects data that fully optimizes and empowers the user's ability to be the most efficient for allocation and use of mobility assets. The real time tracking, security, accountability, sanitation, and maintenance recordings/functions enables the user to have a completely transparent/detailed view of what is going on at any given time. The software may use a Linux operating system and is custom. Able to integrate with other software tracking companies to pull reports and generate if desired by user or customer. Restricting or permitting access for users enables an organization to better create process and limits the amount of hands that can take the mobility assets. At any given time before use, or not in use, the software is able to identify where all tag assets are currently locked/secure in a location and simultaneously know who has a specific asset out. Knowing the number, and for how long, as well offering them where to best return the asset back to the best location for securement before the next requested use.

Figure 9:
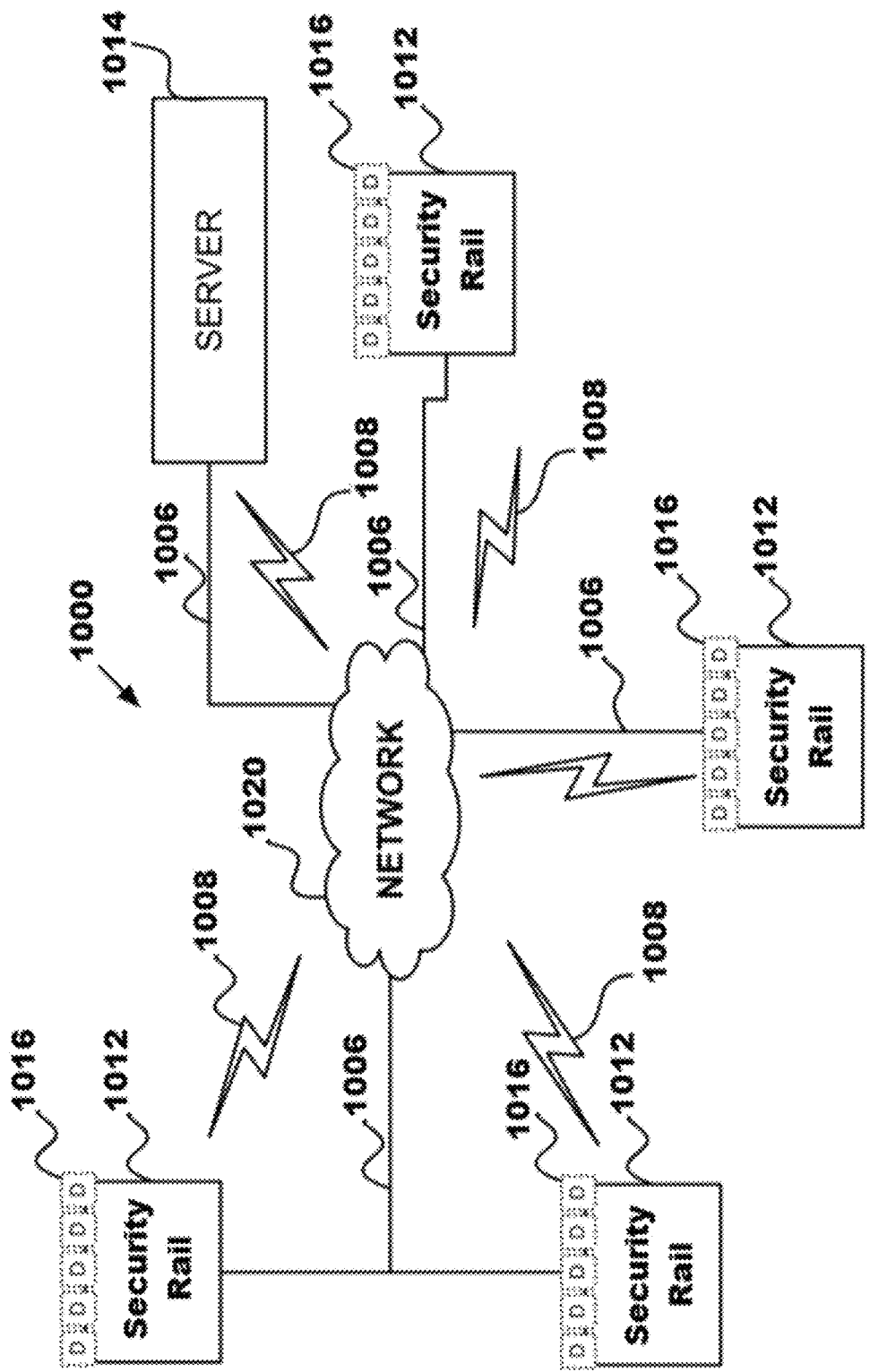
FIG. 9 is an exemplary schematic block diagram of a network interconnecting multiple mobile accessory storage and tracking systems in accordance with the current disclosure.

FIG. 9 illustrates an exemplary network 1000 in which a system and method, consistent with the present disclosure, may be implemented. The network 1000 may include multiple security rails 1012, in the present situation, each security rail 1012 is capable of securing multiple mobile accessories in security space 1016 (that can also be called docks 1016). The network 1020 can equally use a wired 1006, wireless 1008 and optical (not shown) communication network. Each security rail 1012 is adapted to communicate with a server 1014 through the network 1020. The server 1014 and computer 1030, see FIG. 10, can be referred to as a general purposed computer system to define its components and properties that are analogous to a computer system and be referred to as an exemplary security system thereafter. The network 1020 may include a local area network (LAN), a wide area network (WAN), a phone network, such as the Public Switched Phone Network (PSTN), an intranet, the Internet, Wi-Fi, WiMAX or a combination of networks. The server 1014 may include one or more types of computer systems, such as a mainframe, minicomputer, or personal computer, capable of connecting to the network 1020 to enable server 1014 to communicate with security rails 1012. In alternative implementations, server 1014 may include mechanisms for directly connecting to one or more security rails 1012. With respect to FIG. 10, two (2) security rails 1012 and one server 1014 have been illustrated connected to network 1020 for simplicity. In practice, there may be more or less security rails 1012 and servers 1014. Also, in some instances, a security rail 1012 may perform the functions of server 1014. Alternatively, each security rail 1012 can connect to network 1020 alone with embedded communication equipment (not illustrated) that could illustratively be adapted to communicate with network 1014, with Internet protocol (IP) or via a mobile phone line.

Security rails 1012 may have the form of, but not limited thereto, a security space 1016 or docks 1016, such as a lateral space allowing multiple mobile accessories to "stack" or "nest" with respect to one another, like shopping carts stored for use at a store, while being secured within security space 1016 and unable to be removed from same without proper access or authority.

Figure 10:
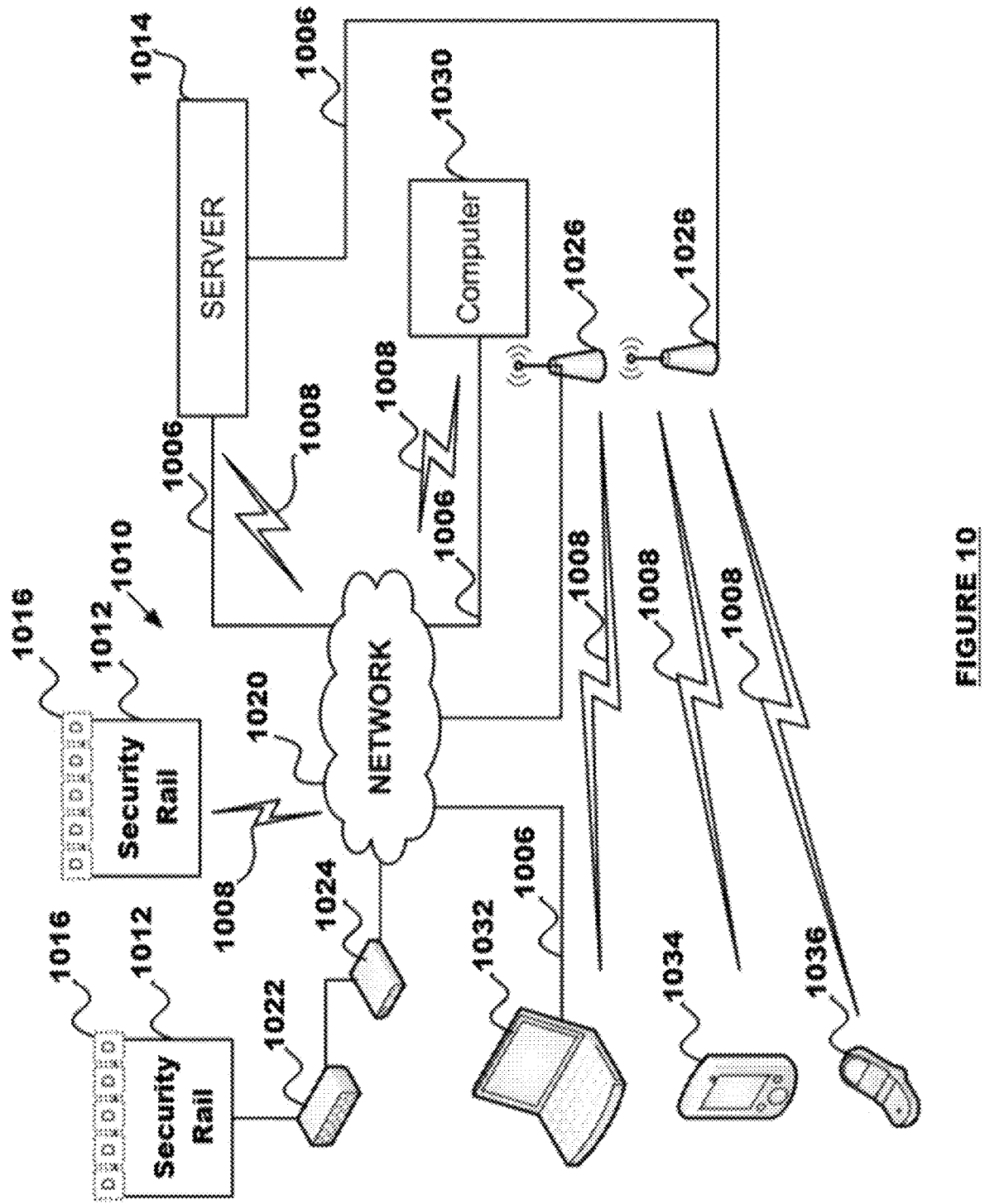
FIG. 10 is an exemplary schematic block diagram of a network interconnecting several security rails in accordance with the current disclosure.

In an implementation consistent with at least one embodiment, server 1014 may be used to communicate with other stations 1012 and other machines capable of communicating with the network 1020 via a wired (represented with solid lines in FIGS. 9 and 10) or a wireless connection (represented with lightning in FIGS. 9 and 10) using a wireless transmitter 1026. With reference to FIG. 10, network 1020 includes server 1014 that is adapted to communicate with security rails 1012 optionally using an embedded or an external hub 1022 and modem 1024. Server 1014 and security rails 1012 can communicate with other computers 1030, portable computers 1032, personal digital assistants 1034 or mobile phones 1036. Communications can be provided upstream or downstream for all connected devices.

Figure 11:
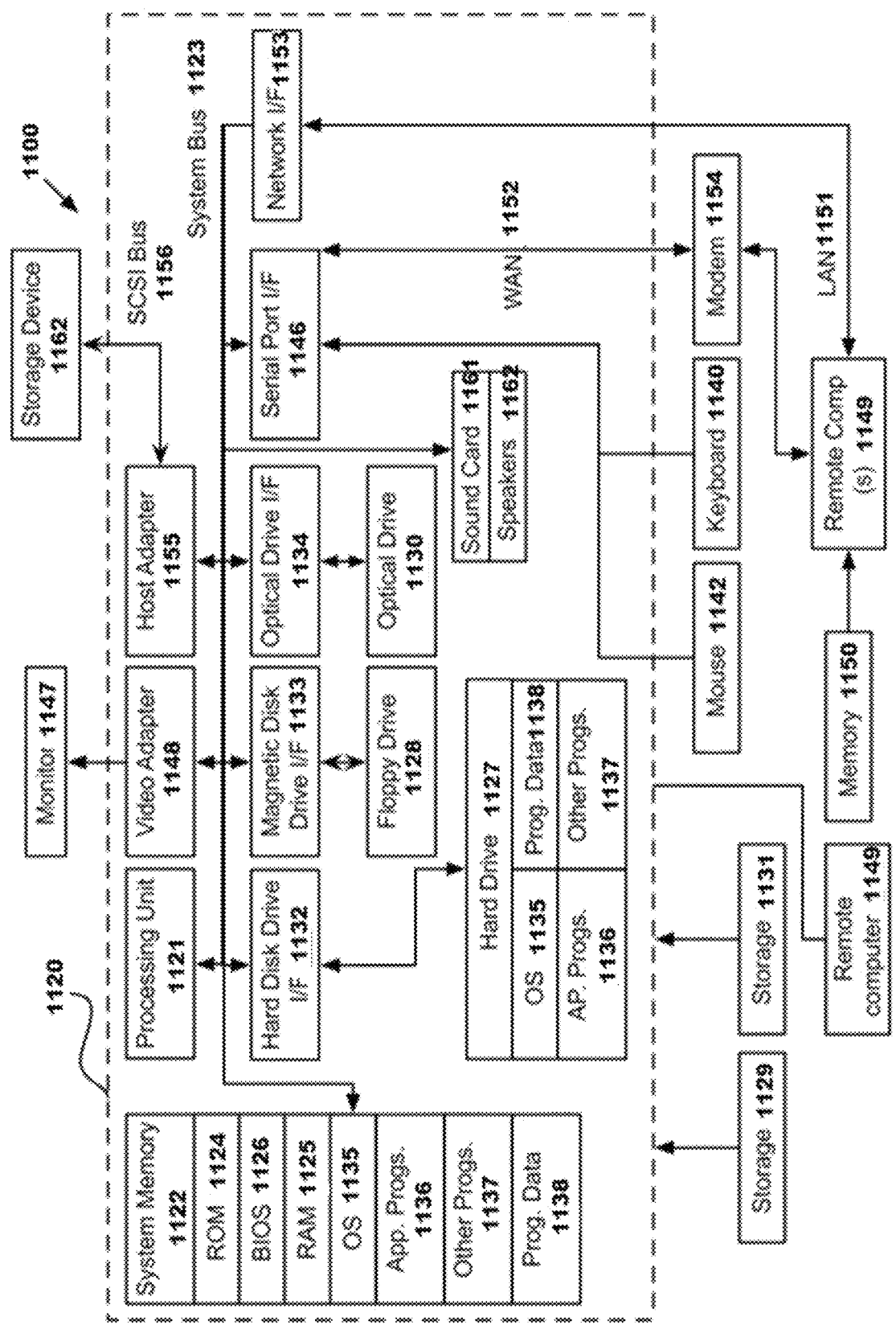
FIG. 11 is an exemplary schematic block diagram of a system in accordance with the current disclosure.

With reference to FIG. 11, an exemplary apparatus 1100 for implementing at least some aspects of the present invention includes a general-purpose computing device in the form of a computerized machine 1120 or in the form of a computerized portable apparatus. The computerized machine 1120 generally includes a processing unit 1121, a system memory 1122, and a system bus 1123 that couples various system components, including the system memory 1122, to the processing unit 1121. The system bus 1123 may be any of several types of bus structures including a memory bus or memory controller, a peripheral bus, and a local bus using any of a variety of bus architectures. The system memory may include read only memory (ROM) 1124 and/or random access memory (RAM) 1125. A basic input/output system 1126 (BIOS), containing basic routines that help to transfer data between elements within the computerized machine 1120, such as during start-up, may be stored in ROM 1124. The computerized machine 1020 may also include a hard disk drive 1127 for reading from and writing to a hard disk, (not shown), a magnetic disk drive 1128 for reading from or writing to a (e.g., removable) magnetic disk 1129, and an optical disk drive 1130 for reading from or writing to a removable (magneto) optical disk 1134 such as a compact disk or other (magneto) optical media. The hard disk drive 1127, magnetic disk drive 1128, and (magneto) optical disk drive 1030 may be coupled with the system bus 1123 by a hard disk drive interface 1132, a magnetic disk drive interface 1033, and a (magneto) optical drive interface 1134, respectively. The drives and their associated storage media provide nonvolatile (or persistent) storage of machine-readable instructions, data structures, program modules and other data for the computerized machine 1120. Although the exemplary environment described herein employs a hard disk, a removable magnetic disk 1129 and a removable optical disk 1131, these skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 1127, magnetic disk 1129, (magneto) optical disk 1131, ROM 1124 or RAM 1125, such as an operating system 1135 (for example, Windows® NT® 4.0, sold by Microsoft® Corporation of Redmond, Wash. Or an alternate proprietary operating system adapted to provide only the functions required by the present security rail 2012), one or more application programs 1136, other program modules 1137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 1138 for example.

A user may enter commands and data into the computerized machine 1120 through input devices, such as a keyboard 1140, a camera 1141 and pointing device 1142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 1121 through a serial port interface 1146 coupled to the system bus. However, input devices may be connected by other interfaces, such as a parallel port, a game port, blue tooth connection or a universal serial bus (USB). For example, since the bandwidth of the camera 1141 may be too great for the serial port, the video camera 1141 may be coupled with the system bus 1123 via a video capture card (not shown). The video monitor 1147 or other type of display device may also be connected to the system bus 1123 via an interface, such as a video adapter 1148 for example. The video adapter 1148 may include a graphics accelerator. One or more speaker 1162 may be connected to the system bus 1123 via a sound card 1161 (e.g., a wave table synthesizer such as product number AWE64 Gold Card from Creative® Labs of Milpitas, Calif.). In addition to the monitor 1147 and speaker(s) 1162, the computerized machine 1120 may include other peripheral output devices (not shown), such as a printer for example. As an alternative or an addition to the video monitor 1147, a stereo video output device, such as a head mounted display or LCD shutter glasses for example, could be used.

The computerized machine 1120 may operate in a networked environment, which defines logical connections to one or more remote computers, such as a remote computer 1149. The remote computer 1149 may be another personal computer, a server, a router, a network PC, a peer device or other common network node, and may include many or all of the elements described above relative to the computerized machine 1120, although only a memory storage device has been illustrated in FIG. 11. The logical connections depicted in FIG. 11 include a local area network (LAN) 1151 and a wide area network (WAN) 1152, an intranet and the Internet.

When used in a LAN, the computerized machine 1120 may be connected to the LAN 1151 through a network interface adapter (or "NIC") 1153. When used in a WAN, such as the Internet, the computerized machine 1120 may include a modem 1154 or other means for establishing communications over the wide area network 1152 (e.g. Wi-Fi, WinMax). The modem 1154, which may be internal or external, may be connected to the system bus 1123 via the serial port interface 1146. In a networked environment, at least some of the program modules depicted relative to the computerized machine 1120 may be stored in the remote memory storage device. The network connections shown are exemplary and other means of establishing a communications link between the computers may be used.

Figure 12:
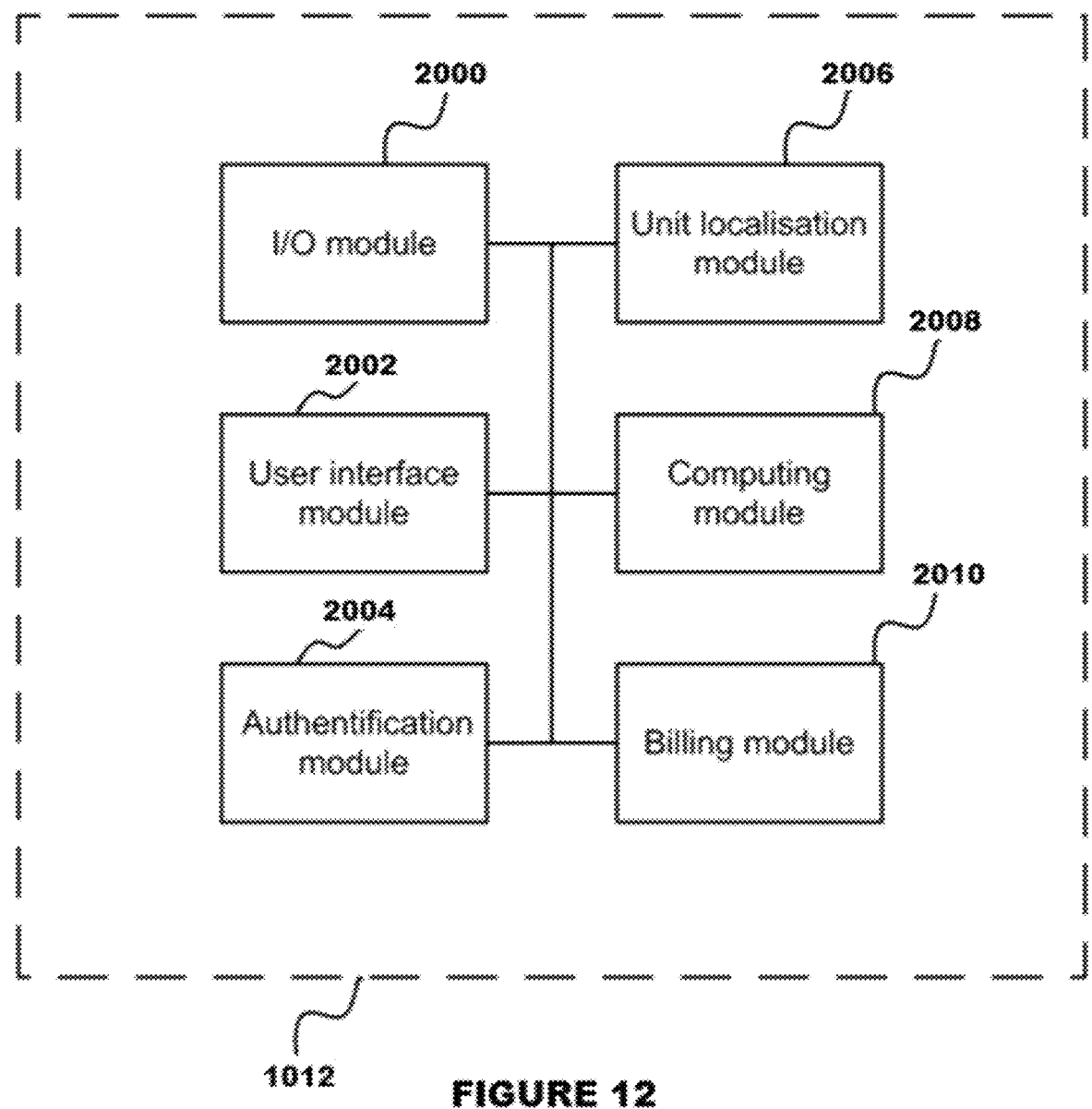
FIG. 12 is an exemplary schematic block diagram of a system in accordance with the current disclosure.
Figure 13:
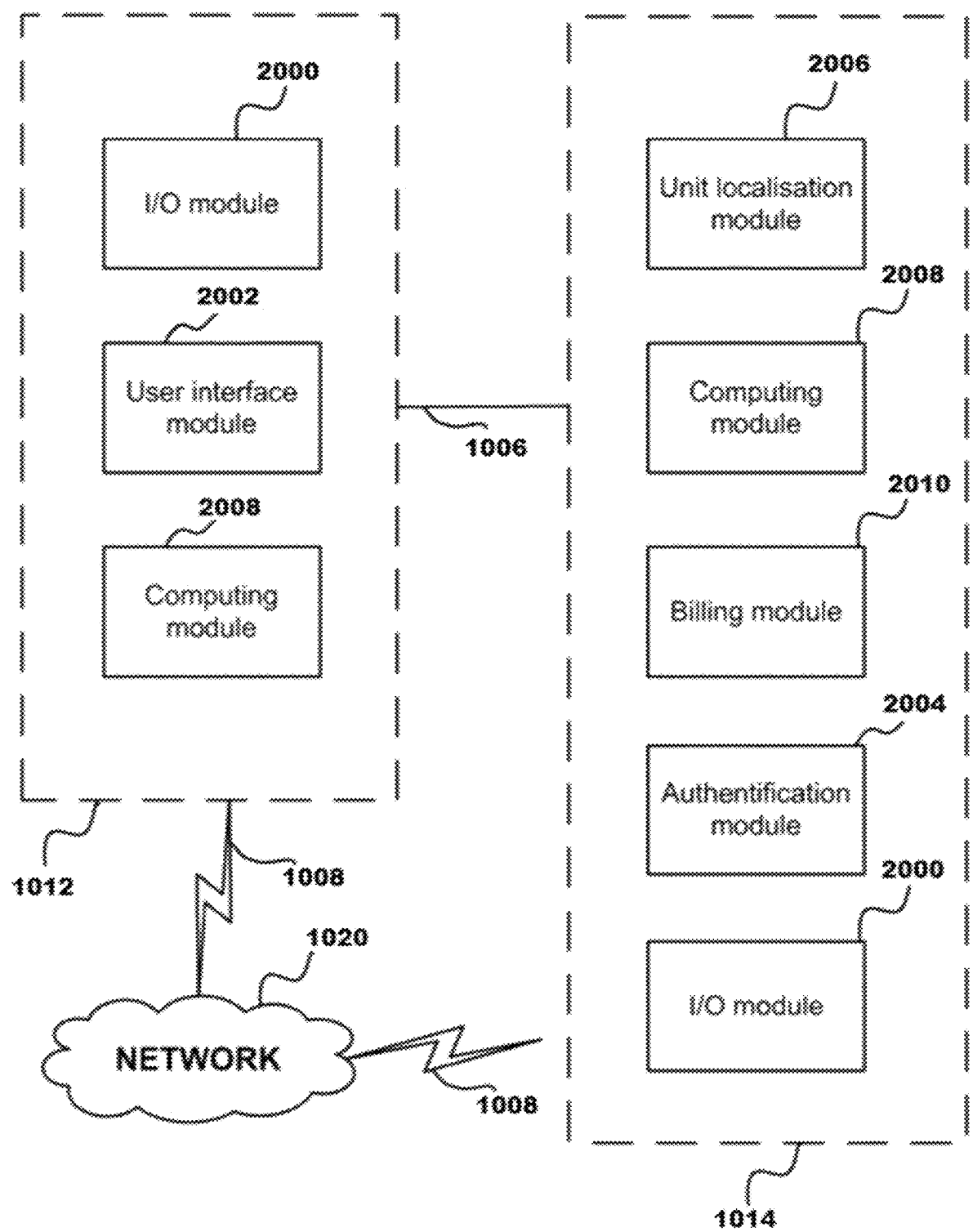
FIG. 13 is an exemplary schematic block diagram of a system for associating a mobile computing device with a vehicle in accordance with the current disclosure.

Turning now to FIG. 12 illustrating an exemplary embodiment of a security rail 1012 with significant illustrative modules therein. Each security rail 1012 might comprise an input/output (I/O) module 2000 configured to receive inputs such as signals from the network 1020 or inputs from a user and provide outputs like an output signal from the security rail 1012. A user interface module 2002 is adapted to provide text and graphical dialogs to the user and receive inputs from the user. An authentication module 2004 is adapted to carry out an authorization task that could be, for example, to receive credit card data, finger print data or alphanumerical password code to associate and authenticate a user with the security system. A unit localization module 2006 tracks mobile accessories (alternatively wheelchairs, carts, luggage racks, etc. for instance) engaged with their respective docks 1016 at a plurality of security rails 1012 and localize them on a map such that localization and distribution is assessed and demonstrated if required to the user in either a list or a graphical form as later exemplified by FIG. 14. A computing module 2008 provides computing power for processing data, collects inputs and provides outputs thereof. A billing module 210 is also provided at security rail 1012 to manage all payments required with each mobile accessory rental, if security rail 1012 is configured to allow users to pay for access to the mobile accessories. Payment can be made with a credit card, Interac or other physical or electronic payment means including through the use of an electronic wallet residing in a mobile phone. Further, the current disclosure FIG. 13 is an alternate embodiment of the system described in FIG. 12 where modules are distributed between the security rail 1012 and the server 1014 interconnected via the network 1020. In this networked embodiment the security rail 1012 comprises the I/O module 2000, the user interface module 2002 and a computing module 2008 comparable to the previous embodiment. Some functions are performed with modules disposed on server 1014. Server 1014, in this embodiment, comprises the unit localization module 2006, a computing module 2008 adapted to provide calculation capabilities to the server 1014, the billing module 2010, the authentication module 2004 and an I/O module 2000. The modules, and/or the functions they respectively provide, can be distributed in other ways between the server 1014 and security rail 1012 without departing from the scope of the present disclosure.

Figure 14:
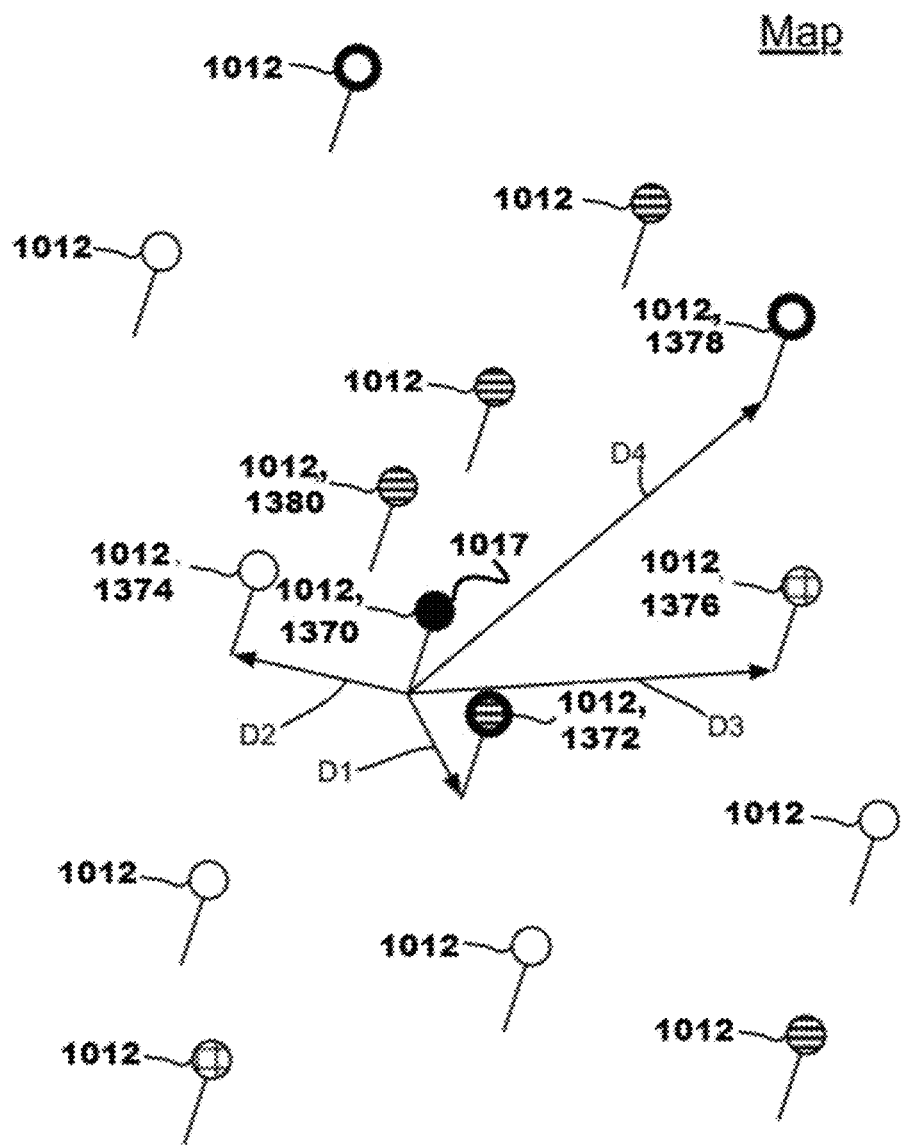
FIG. 14 is an exemplary illustrative map indicating mobile accessory availability and distances of security rails in accordance with an the current disclosure.

Turning now to FIG. 14 illustrating an exemplary map of the geographical positions of security rails 1012 in a hypothetical location, such as a hospital campus, apartment complex. Hotel, casino, etc. Departure security rail 1012, 1370 is shown as a full security rail 1012 where all possible security space/docks 1016 are occupied by mobile accessories 1017. A user who wants to use, or rent, mobile accessory 1017 from security rail 1012, 1370, may be incentivized to have user move mobile accessory 1017 from a security rail 1012 that all security space/docks 1016 are taken, such as 1370, and to deposit mobile accessory 1017 in another security rail 1012, such as 1374, after use is complete, where an empty or partially empty security space/dock 1016 is available. Conversely, a user who obtains a mobile accessory 1017 from station 1380, that has some mobile accessories 1017 therein, would not be incentivized because there is no need to remove or to add mobile accessories 1017 from station 1012, 1380. In one instance, a user could take a mobile accessory 1017 from station 1012, 1370 and receive an SMS message informing him/her to bring mobile accessory 1017 to empty station 1012, 1374. In this situation the user/renter may receive departure incentive rewards and arrival incentive rewards to encourage this action. In an employment setting, the user, an employee, may be directed to return a particular mobile accessory 1017 to a security rail 1012, such as 1378, because this security rail 1012, 1378 is one of the most used systems in the security rail infrastructure and is in constant need of mobile accessories 1017 for availability and use.

The same principle can be used to identify the distance and the vertical difference between security rails 1012, such as for example at a large apartment complex, casino or hospital. This way, a user may receive an idea of the difficulty of each path between security rails 1012. The quantity of energy required going from either the location of mobile accessory 1017 or from a security rail 1012 to another security rail 1012 can be provided.

Users may also be incentivized to bring mobile accessory 1017 to security rail 1012, 1378 because security rail 1012, 1378 is also empty and is also used more than security rail 1012, 1374. Incentives, or simply a direction to return a certain mobile accessory 1017 to a particular security rail 1012, may be attributed by taking into consideration the historical use of each security rail 1012 to ensure there are always some mobile accessories 1017 to use/rent and some receiving security space/docks 1016 available at each security rail 1012. The distance can also effect the amount of given incentive rewards, if same are provided. For instance, security rail 1012, 1378 is further away at distance D4 from security rail 1012, 1370 than security rail 1012, 1374 at distance D2. Additional incentive rewards, such as a partial refund, may be given to the user because of the longer distance and/or the vertical distance there between.

The illustrative embodiment of FIG. 14 uses, inter alia, the historical usage data, the day and the time of the day, the distance, the number of mobile accessories 1017 at security rail 1012 and the amount/number of security space/empty docks 1016 at security rails 1012 to make a determination of an incentive to move mobile accessories 1017 between security rails 1012 by users/employees as opposed to move mobile accessories 1017 manually by users/employees releasing and moving mobile accessories when they are not actually needed. The algorithm can weigh each criterion to determine optimal incentive rewards to offer to users or to demand/require that certain security rails 1012 be filled immediately. The incentive rewards could exemplary be, inter alia, a membership cost credit, a reduced user cost, "atagirls" or "ataboys" for employees, a "brownie point" system capable of redemption for employer benefits, gifts, time off, etc., incentive points, Airmiles™, Aeroplan™ or other means to influence the choice of the user without departing from the scope of the present disclosure.

Figure 15:
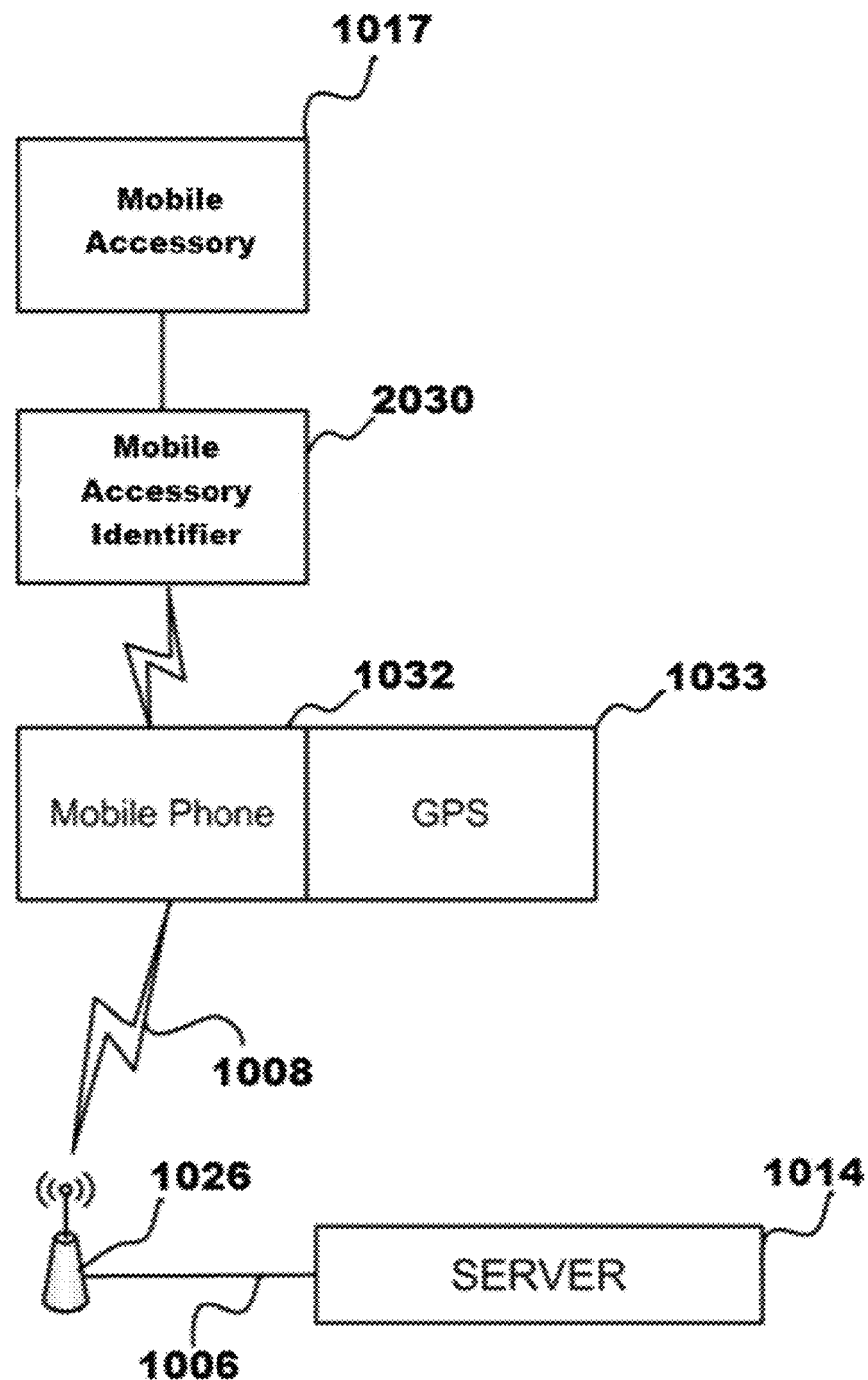
FIG. 15 is an exemplary schematic block diagram of a system for associating a mobile computing device with a vehicle in accordance with an embodiment of the invention.

A mobile computing device, such as a mobile phone 1032, as illustrated in FIG. 15, can be integrated to the network 1020 to remotely interact with the network 1020 when mobile accessory 1017 is on the move. Mobile phone 1032 may become an extension of the network 1020 to provide the user with a user graphical interface capability enabling further or more complicated user interactions with the network 1020. It is desirable that the mobile phone 1032 be paired the mobile accessory 1017 to identify mobile accessory 1017 to network 1020 and server 1014. Mobile accessory 1017 identification can be made, for instance, with a mobile accessory identifier 2030 that can be an identification number or a serial number. Pairing of the mobile phone 1032 can be made with the recognition of a mobile accessory identifier 2030 that can be embodied in an RFID tag associated with the mobile accessory. If any electronics is embedded on mobile accessory 1017, then, a connection via Bluetooth™ can be performed and further interactions between mobile accessory 1017 and mobile phone 1032 can be made. Mobile phone 1032 could, for example, receive information from mobile accessory 1017 such as the speed of mobile accessory 1017, the distance performed by the mobile accessory 1017, the time of connection between the mobile phone 32 and the mobile accessory 1017 (or with the mobile accessory identifier 230), the rental cost based, at least in part, on the time of connection, if the user is paying for use of mobile accessory 1017. In other words, a two way dialogue can occur between mobile accessory 1017 and mobile phone 1032 as opposed to a simple passive identification. A wired connection, although it might not be the most desirable, is encompassed by the present disclosure and is considered to be a proper way to connect mobile phone 1032 with mobile accessory 1017.

Alternatively, a user may make a mobile accessory reservation through a computer or a mobile computing device. The system provides the user with mobile accessory 1017 availability in real time or extrapolates the availability of mobile accessories 1017 in the future based on historical data. Once the reservation is made, the user can directly associate his or her mobile computing device 1032, 1034, 1036 (e.g. mobile phone 1032) with a mobile accessory at a predetermined security rail 1012 to unlock a mobile accessory 1017. Once mobile computing device 1032, 1034, 1036 of the user is associated with the mobile accessory 1017, the system acknowledges use/rental of mobile accessory 1017 and processes the use/rental information.

Figure 16:
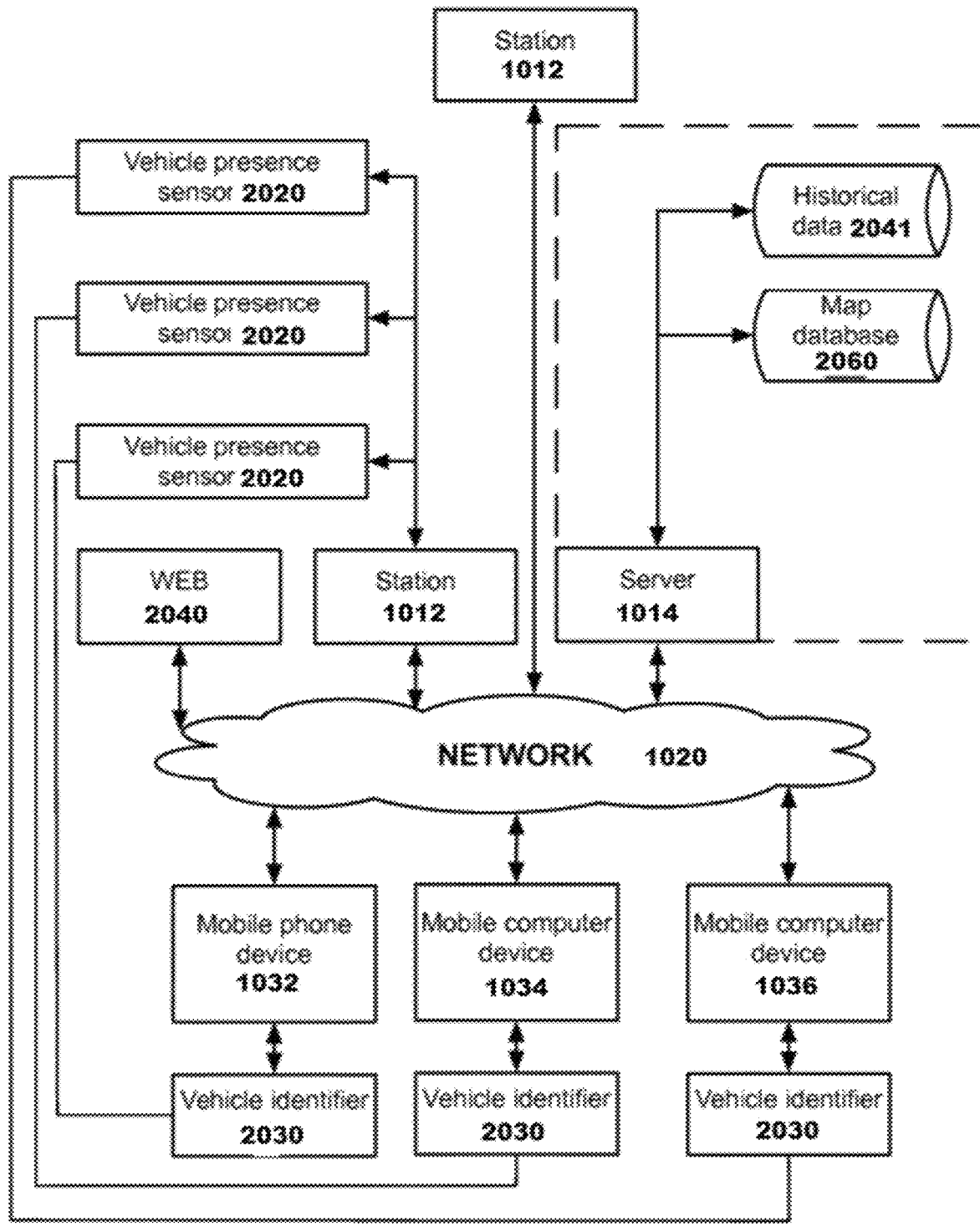
FIG. 16 is an exemplary schematic block diagram of a system for managing data between vehicles, stations and computing devices in accordance with an embodiment of the invention.

Geographical localization functions 1033 of mobile phone 1032 can be used to locate the mobile accessory 1017 and provide the information to network 1020. FIG. 16 illustrates another exemplary alternate embodiment adapted to connect additional computer devices 1032, 1034, 1036 to the network 1020 to exchange data with computer devices 1032, 1034, 1036, to extend network 1020 and for performing additional functions thereby. A series of mobile accessory presence sensors 2020 adapted to recognize a mobile accessory 1017 secured in an associated security space/dock 1016, is connected to security rail 1012. As previously mentioned, each mobile accessory is equipped with a unit identifier 2030 allowing individual mobile accessory 1017 recognition by presence sensor 2020. Security rail 1012 is thus adapted to detect an individual mobile accessory 1017 equipped with its respective mobile accessory identifier 2030 (illustrated in FIG. 15). Mobile accessory presence sensor 2020 is further adapted to send a corresponding signal to security rail 1012 that will be transmitted to server 1014. The system illustrated in FIG. 16 is further connected to the Internet to be accessed via a website or another web enabled application (e.g. a browser, an application or an iApp™ for iPhone™).

As mentioned supra, mobile accessory identifier 2030 is associated with a specific mobile accessory 1017 to pair the mobile accessory 1017 with security space/dock 1016 and also to pair with the computer device 1032, 1034, 1036 of the user. This pairing of the mobile accessory identifier 2030 and the computer device 1032, 1034, 1036 of a user allows to associate a mobile accessory 1017 with the computer device such that the system embodied in FIG. 16 can transfer data to computer device 1032, 1034, 1036 of the user of the mobile accessory 1017 taking into consideration which mobile accessory 1017 is paired therewith. Again, the mobile accessory identifier 2030 could be an RFID tag, a blue tooth wireless connection or another means suitable to associate a computer device 1032, 1034, 1036 with mobile accessory 1017. In one instance, computer device 1036 may be a mobile phone 1032. Mobile phone 1032 is paired with mobile accessory identifier 2030 of mobile accessory 1017 and uses unit identifier 2030 so that the mobile phone 1032 is configured to exchange data with network 1020 related with the activity of the user with the identified mobile accessory 1017. Data could be provided in the form of SMS text, e-mail message, via a web page or a dedicated application that manages data related to the activity of the user with the rented mobile accessory 1017.

Alternatively, usage data may be recorded on the computer device 1032, 1034, 1036 to allow the user to track his or her performance or this data may be transmitted through network 1000 to server 1014 for use to determine optimal routes, usage, historical usage, etc. The duration, the speed, the vertical distance and the pace along a path may be recorded and used to provide statistics of use that can be material into providing metrics for improving the user's performance with the mobile accessory 1017—if the mobile accessory 1017 is adapted for doing exercise, such as a scooter, bike, etc.

According to a further embodiment, user interface 132 may include standard interfaces to authentication and payment systems using RFID (radio frequency identification) and NFC (near field communication) technology, enabling both spontaneous on-the-spot usage of mobile accessories as well as authentication of pre-reserved mobile accessories. The system may even may use of a white-list, enabling users to use mobile accessories eve in circumstances of temporary lack of network connectivity.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for storing, tracking, and regulating upkeep with respect to mobile accessories comprising:
    providing at least one security rail comprising a single ingress/egress opening, a detention end, and a security space defined between the single ingress/egress opening and the detention end;
    providing at least one sensor disposed on the security rail to receive a proximity signal from a mobile accessory transmitter;
    providing at least one user interface, wherein the interface is in electronic communication with the security rail and the at least one sensor;
    providing a network and a server, wherein the server is in electronic communication with the at least one security rail and the at least one user interface;
    establishing a security rail identifier for each security rail and entering same into the network;
    establishing a mobile accessory identifier for each mobile accessory and entering same into the network;
    establishing an authentication protocol for allowing mobile accessories to be removed from the at least one security rail and entering same into the network;
    authentication by the server, via the authentication protocol, of an access request made at the user interface;
    wherein the least one security rail and at least one user interface are configured such that:
        when the server authenticates the access request made at the user interface; and
        the at least one sensor receives the proximity signal from the mobile accessory transmitter, a releasable lock is moved from a locked position to an unlocked position to allow the at least one mobile accessory to be removed from the at least one security rail.

2. The method of claim 1, wherein multiple security rails exist within the network and communicate with the server.

3. The method of claim 1, further comprising providing a sanitizing feature.

4. The method of claim 3, wherein information regarding use of the sanitizing feature is input as the mobile accessory is being released from the security rail.

5. The method of claim 1, wherein the authentication protocol comprises reading an employee identification badge.

6. The method of claim 1, wherein the authentication protocol comprises paying for access to at least one mobile accessory contained within the security rail.

7. The method of claim 1, further comprising the user interface identifying the mobile accessory as docked, if the mobile device is engaged with the security rail and entering same into the network.

8. The method of claim 1, further comprising identifying the mobile accessory as in use, if the mobile device is being released from the security rail.

9. The method of claim 1, further comprising a second sensor present on the security rail.

10. The method of claim 1, further comprising limiting movement of the movement feature within the security space to linear movement substantially along a single axis extending between the single ingress/egress opening and the detention end.

* * * * *